(12) United States Patent
Nakase

(10) Patent No.: US 7,904,463 B2
(45) Date of Patent: Mar. 8, 2011

(54) INFORMATION DISPLAY APPARATUS AND METHOD

(75) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 11/832,867

(22) Filed: Aug. 2, 2007

(65) Prior Publication Data

US 2008/0052321 A1   Feb. 28, 2008

(30) Foreign Application Priority Data

Aug. 23, 2006 (JP) ................................ 2006-227020

(51) Int. Cl.
 *G06F 7/00* (2006.01)
 *G06F 17/30* (2006.01)
(52) U.S. Cl. ......................................... 707/752; 707/711
(58) Field of Classification Search .................. 707/711, 707/752
 See application file for complete search history.

(56) References Cited

U.S. PATENT DOCUMENTS

| | | | |
|---|---|---|---|
| 2005/0223037 A1* | 10/2005 | Ahn et al. | 707/104.1 |
| 2006/0074945 A1* | 4/2006 | Mori | 707/100 |
| 2006/0074973 A1* | 4/2006 | Platt et al. | 707/102 |
| 2007/0033192 A1* | 2/2007 | Sakoh et al. | 707/10 |

FOREIGN PATENT DOCUMENTS

JP   08-106453   4/1996

* cited by examiner

*Primary Examiner* — Van H. Oberly
(74) *Attorney, Agent, or Firm* — Cowan, Liebowitz & Latman, P.C.

(57) ABSTRACT

An information display apparatus which reproduces images stored in a detachable recording medium acquires file identifying information which identifies a file stored in the recording medium. Also, it determines whether or not specific attribute information about the file identified by the file identifying information exists and acquires attribute information existence information which indicates the presence or absence of the attribute information. Then, the information display apparatus generates an image file list which associates the file identifying information with the attribute information existence information. The information display apparatus acquires, from the recording medium, specific attribute information about files determined to have attribute information by the attribute information existence information among files recorded in the image file list and determines a reproducing method of files stored in the recording medium based on the file identifying information and the attribute information.

9 Claims, 18 Drawing Sheets

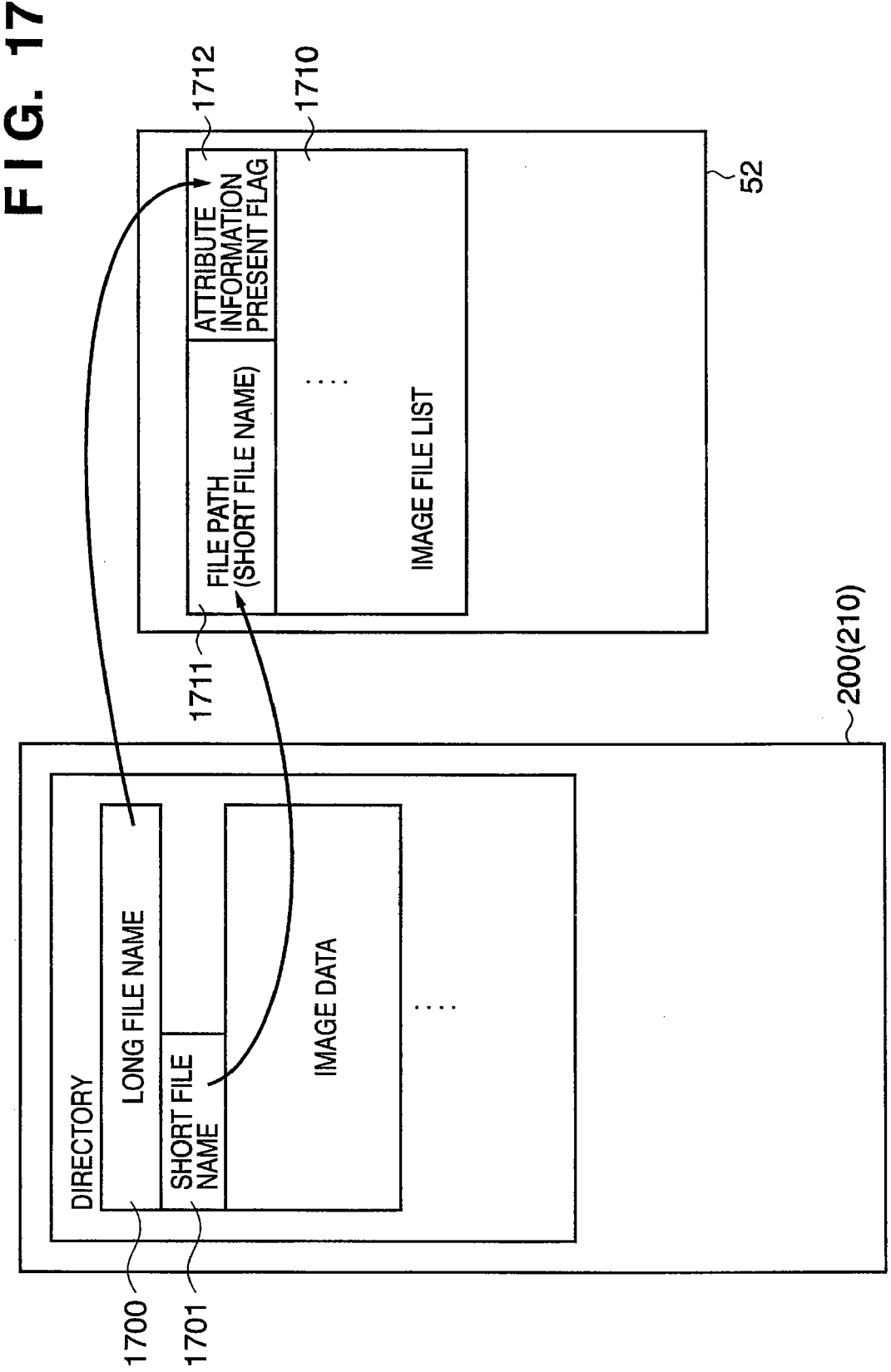

INFORMATION DISPLAY APPARATUS AND METHOD

BACKGROUND OF THE INVENTION

1. Field of the Invention

The present invention relates to an information display apparatus which reproduces images and the like, and a control method therefor.

2. Description of the Related Art

As information display apparatuses which reproduce image data stored in recording media, image display apparatuses are known which reproduce and display images in a predetermined order, such as by file names or by date, without dependence on the directory structure in the recording media. Also, image display apparatuses are known which have been programmed to recognize a predetermined directory structure and reproduce only those images which conform to the predetermined directory structure. Furthermore, for example, Japanese Patent Laid-Open No. 8-106453 proposes an information processing apparatus which sorts file names by masking specific words in them.

Such information display apparatuses determine a reproducing order of files based on a file list, some by retaining the list of files to be handled using short file names, and others using long file names. However, image display apparatuses incorporated in purpose-built electronic devices such as printers, image viewers, and digital cameras are generally limited in internal resources such as ROM and RAM and it is difficult for them to handle many files by long file names. This has been dealt with, for example, by setting an upper limit on the number of files to be handled. On the other hand, if short file names alone are used to manage files and determine their reproducing order, it is possible to reduce memory usage. However, it is impossible to rearrange files with long file names displayed on a personal computer or the like, causing a difference in order from the personal computer and resulting in a reproducing order that is difficult for the user to understand.

SUMMARY OF THE INVENTION

According to an exemplary embodiment of the present invention, there is provided an information display apparatus and method which make it possible to take long file names and the like into account while reducing usage of internal memory when determining a method for reproducing files.

According to one aspect of the present invention, there is provided an information display apparatus which reproduces images stored in a detachable recording medium, comprising: a first acquiring unit adapted to acquire file identifying information which identifies a file stored in the recording medium; a second acquiring unit adapted to judge whether or not specific attribute information about the file identified by the file identifying information exists and acquire attribute information existence information which indicates the presence or absence of the attribute information; a generating unit adapted to generate an image file list which associates the file identifying information with the attribute information existence information; and a determining unit adapted to acquire, from the recording medium, specific attribute information about files determined to have attribute information by the attribute information existence information among files recorded in the image file list and determine a reproducing method of files stored in the recording medium based on the file identifying information and the attribute information.

According to another aspect of the present invention, there is provided a control method for an information display apparatus which reproduces images stored in a detachable recording medium, comprising: a first acquiring step of acquiring file identifying information which identifies a file stored in the recording medium; a second acquiring step of judging whether or not specific attribute information about the file identified by the file identifying information exists and acquiring attribute information existence information which indicates the presence or absence of the attribute information; a generating step of generating an image file list which associates the file identifying information with the attribute information existence information; and a determining step of acquiring, from the recording medium, specific attribute information about files determined to have attribute information by the attribute information existence information among files recorded in the image file list and determining a reproducing method of files stored in the recording medium based on the file identifying information and the attribute information.

Further features of the present invention will become apparent from the following description of exemplary embodiments with reference to the attached drawings.

BRIEF DESCRIPTION OF THE DRAWINGS

FIG. 17 is a diagram illustrating an image file list formed in memory.

DESCRIPTION OF THE EMBODIMENTS

A preferred embodiment of the present invention will be described below with reference to the accompanying drawings. Incidentally, a digital camera will be taken as an example of an information display apparatus according to the present invention.

<<Configuration of Digital Camera>>

Figure 1:
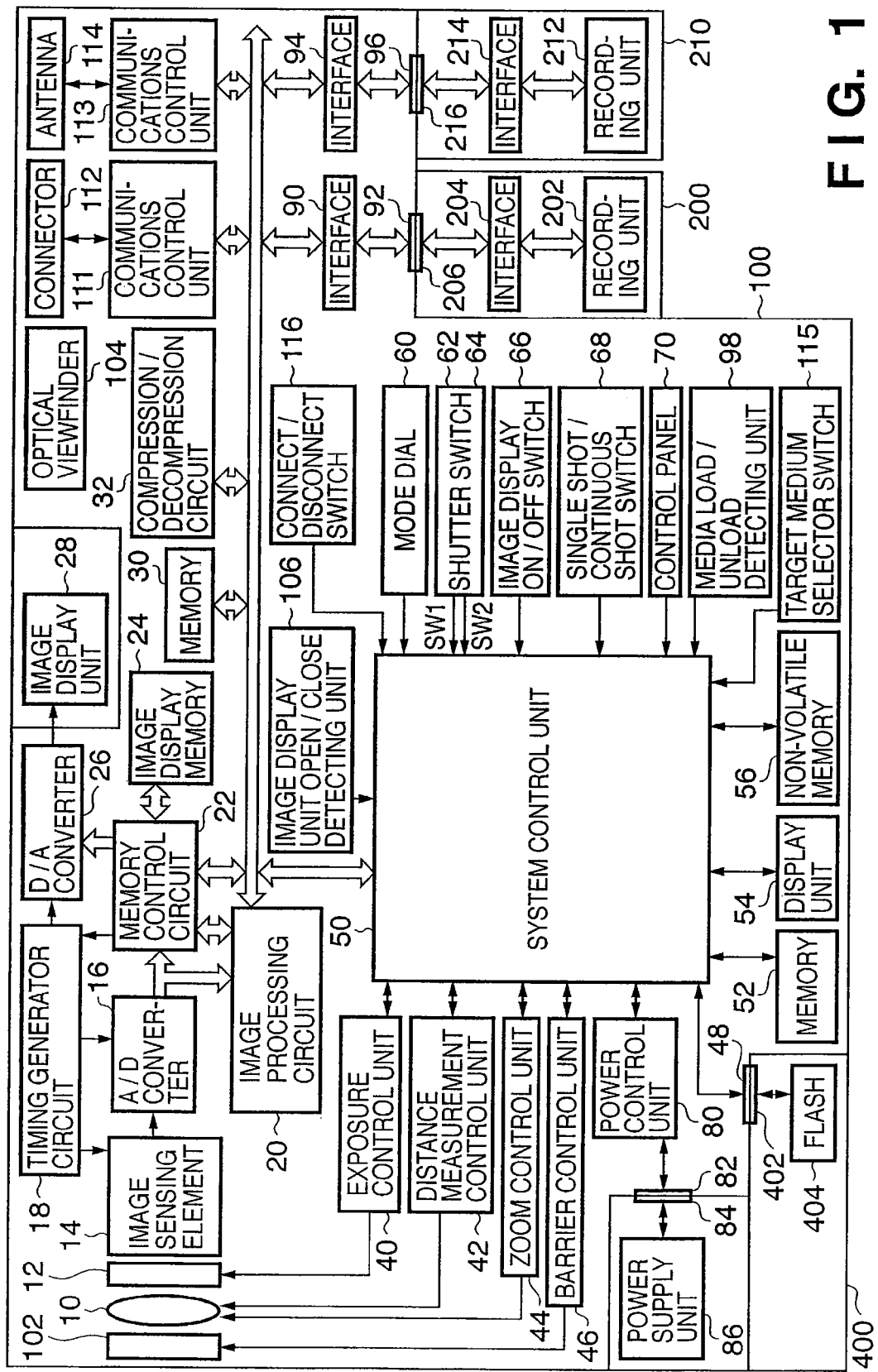
FIG. 1 is a block diagram showing a system configuration of a digital camera according to this embodiment.
Figure 2:
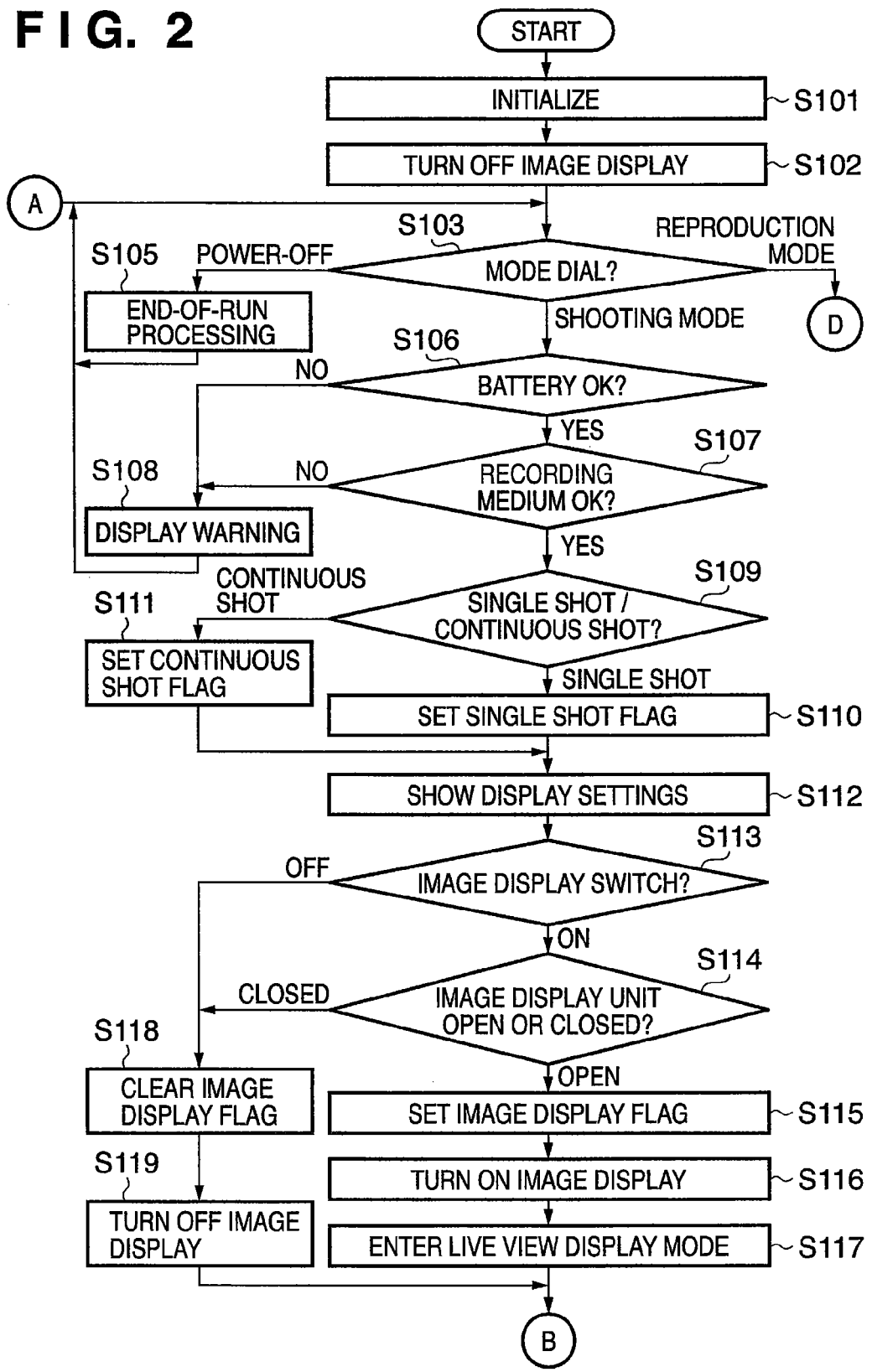
FIG. 2 is a flowchart of a main routine of a digital camera according to this embodiment.

FIG. 1 is a diagram showing a configuration of a digital camera according to this embodiment. In FIG. 1, reference numeral 100 denotes a digital camera which is an image processing/display apparatus. The digital camera 100 has a lens 10 for shooting (hereinafter referred to as a taking lens 10), a shutter 12 with an aperture adjustment function, an image sensing element 14 which converts optical images into an electrical signal, and an A/D converter 16 which converts an analog signal output from the image sensing element 14 into a digital signal.

A timing generator circuit 18 supplies clock signals and control signals to the image sensing element 14, the A/D converter 16, and a D/A converter 26. The timing generator circuit 18 is controlled by a memory control circuit 22 and system control unit 50. An image processing circuit 20 performs a predetermined pixel interpolation process or color conversion process on data from the A/D converter 16 or memory control circuit 22. Also, the image processing circuit 20 performs predetermined computational processes using image data which has been picked up. Using computational results obtained from the image processing circuit 20, the system control unit 50 controls an exposure control unit 40 and distance measurement control unit 42. Consequently, the system control unit 50 accomplishes a TTL (through-the-lens) AF (autofocusing) process, AE (automatic exposure) process, and EF (preflashing) process. Furthermore, the image processing circuit 20 performs predetermined computational processes using the image data which has been picked up and performs a TTL AWB (auto white balance) process based on obtained computational results.

The memory control circuit 22 controls the A/D converter 16, the timing generator circuit 18, the image processing circuit 20, an image display memory 24, the D/A converter 26, a memory 30, and a compression/decompression circuit 32. Data from the A/D converter 16 is written into the image display memory 24 or memory 30 via the image processing circuit 20 and memory control circuit 22 or via the memory control circuit 22 directly from the A/D converter 16.

The image data for display written into the image display memory 24 is displayed by an image display unit 28 via the D/A converter 26. The image display unit 28 consists of a TFT LCD or the like. By displaying picked-up image data on the image display unit 28 in sequence, it is possible to implement an electronic viewfinder function. Also, the image display unit 28 can turn on and off the display at any time at the instruction of the system control unit 50. When the display is turned off, power consumption of the digital camera 100 can be reduced greatly. Furthermore, the image display unit 28 is coupled to the body of the digital camera 100 via a rotatable hinge unit, making it possible to implement various display functions, including the electronic viewfinder function and reproduction/display function, with the image display unit 28 set to a desired direction and angle. Also, the image display unit 28 can be stored with its display screen facing the digital camera 100. When the image display unit 28 is stored in this way, display operation of the image display unit 28 can be stopped upon detection of the stored state by an image display unit open/close detecting unit 106.

The memory 30 is used to store still images and moving images that have been shot. It has sufficient storage capacity to store a predetermined number of still images and a predetermined duration of a moving image. This makes it possible to write large quantities of images into the memory 30 at high speed in the case of continuous shooting or panoramic shooting which involve shooting two or more still images in sequence. The memory 30 can also be used as a work area of the system control unit 50.

The compression/decompression circuit 32 compresses and decompresses image data using adaptive discrete cosine transform (ADCT) or the like. It reads out an image stored in the memory 30, compresses or decompresses the image, and writes the processed data into the memory 30.

The exposure control unit 40 controls the shutter 12 which has an aperture adjustment function. It also performs a flash control function in collaboration with a flash unit 400. The distance measurement control unit 42 controls focusing of the taking lens 10. The system control unit 50 controls the exposure control unit 40 and distance measurement control unit 42 based on the computational results of picked-up image data produced by the image processing circuit 20, and thereby performs TTL control. A zoom control unit 44 controls zooming of the taking lens 10. A barrier control unit 46 controls operation of a protective member 102 which is a barrier.

A connector 48, which is also known as an accessory shoe, combines a mechanical fastening mechanism with an electrical contact with the flash unit 400.

The system control unit 50 controls the entire digital camera 100. A memory 52 stores constants, variables, programs, and the like for operation of the system control unit 50. A display unit 54 has a liquid crystal display, LED, speaker (sound-producing element), and the like. It presents operating states, messages, and the like to the user using characters, images, voice, and the like as the system control unit 50 executes a program. One or more display units 54 are installed in easily visible locations near a control panel of the digital camera 100. Some functions of the display unit 54 are provided in an optical viewfinder 104.

Contents of the display unit 54 displayed on the LCD or the like includes single shot/continuous shot display, self-timer display, compression ratio display, recording pixel count display, available shots display, remaining shots display, shutter speed display, f-stop display, exposure correction display, flash display, red-eye reduction display, macrophotography display, buzzer setting display, clock-battery power display, battery power display, error display, information display by means of multiple numeric digits, loaded/unloaded display of recording media 200 and 210, communications interface operation display, and date/time display. On the other hand, contents of the display unit 54 displayed in the optical viewfinder 104 include in-focus display, camera shake warning display, flash charging display, shutter speed display, f-stop display, and exposure correction display.

A non-volatile memory 56 can maintain storage contents even if power supply is cut off while it is electrically erasable and recordable. Examples of the non-volatile memory 56 include EEPROM.

Reference numerals 60, 62, 64, 66, 68, and 70 denote user interfaces used to enter various operation commands to the system control unit 50. The user interfaces consist of switches, a dial, a touch panel, a pointing device based on line-of-sight detection, a voice recognition device, and the like. The user interfaces will be described concretely below.

A mode dial switch 60 switches among various functional modes including Power-off, Automatic Shooting mode, Shooting mode, Panoramic Shooting mode, Reproduction mode, Multi-screen Reproduction/Erase mode, and PC Connection mode.

A shutter switch 62 turns on when a shutter button (not shown) is half-pressed and generates a shutter switch signal SW1. The shutter switch signal SW1 triggers operations of AF (autofocusing) process, AE (automatic exposure) process, AWB (auto white balance) process, EF (preflashing) process, and the like. A shutter switch 64 turns on when the shutter button (not shown) is fully pressed and generates a shutter switch signal SW2. The shutter switch signal SW2 triggers a sequence of processes: an exposure process, development process, and recording process. Incidentally, in the exposure process, a signal read out of the image sensing element 14 is written into the memory 30 via the A/D converter 16 and memory control circuit 22. In the development process, image data is formed using the data written into the memory 30 and by means of computations performed by the image processing circuit 20 and memory control circuit 22, and written into the memory 30. In the recording process, the image data formed in the development process is read out of the memory 30 and compressed by the compression/decompression circuit 32. The compressed data is written into the detachable recording medium 200 or 210.

An image display ON/OFF switch 66 turns on and off the image display unit 28. When shooting using the optical viewfinder 104, it is possible to save power by cutting off power supply to the image display unit 28. Reference numeral 68 denotes a single shot/continuous shot switch used to set a Single Shot mode which involves taking a single shot when the shutter switch 64 is turned on and then entering a standby state or a Continuous Shot mode which involves shooting continuously as long as the shutter switch 64 is ON. A target medium selector switch 115 is used to specify a target recording medium for shot images by selecting from among "external storage device," "recording medium," and "external storage device and recording medium." A connect/disconnect switch 116 is used to establish or cut off communications with an external device.

A control panel 70 consists of various buttons, a touch panel, and the like. Specifically, it contains a menu button, set button, macro button, multi-screen reproduction/page break button, flash setting button, single shot/continuous shot/self-timer selector button, next menu (+) button, previous menu (−) button, next image (+) button, previous image (−) button, shooting image quality button, exposure correction button, date/time setting button, select/switch button for use to select and switch among various functions during shooting and reproduction in Panorama mode or the like, determine/run button for use to determine and run a function during shooting and reproduction in Panorama mode or the like, image display ON/OFF switch for use to turn on and off the image display unit 28, quick review ON/OFF switch for use to turn on and off a quick review function which automatically reproduces image data immediately after shooting, compression mode switch for use to select a compression ratio of JPEG compression or select a CCDRAW mode which records a signal from the image sensing element on a recording medium by digitizing it directly, reproduction mode switch for use to set functional modes such as a Reproduction mode, Multi-screen Reproduction/Erase mode, and PC Connection mode, reproduction switch for use to start a reproduction operation which involves reading shot images out of the memory 30 or recording medium 200 or 210 and displaying them using the image display unit 28, and the like.

A power control unit 80 includes a battery detecting circuit, a DC-DC converter, and a switching circuit which switches a block to be turned on. The power control unit 80 detects whether or not a battery has been mounted, the type of battery, and remaining battery power. Based on detection results, it controls the DC-DC converter based on instructions from the system control unit 50 and supplies required voltages to various parts including the recording medium for required periods. A power supply unit 86 is connected to the power control unit 80 via connectors 82 and 84. The power supply unit 86 consists of a primary battery such as an alkaline battery and a lithium cell, secondary battery such as a NiCd battery, NiMH battery, or a Li battery, AC adapter, and the like.

Reference numerals 90 and 94 denote interfaces with recording medium such as a memory card and hard disk. Reference numerals 92 and 96 denote connectors used to connect with recording medium such as a memory card and hard disk. Reference numeral 98 denotes a media load/unload detecting unit which detects whether the connector 92 and/or connector 96 are loaded with a recording medium 200 or 210.

Incidentally, although two interfaces and connectors are used to mount recording media according to this embodiment, of course, any number of interfaces and connectors—single or multiple—may be installed to mount recording media. Also, interfaces and connectors of different standards may be installed in combination. Interfaces and connectors compliant with PCMCIA card standards or CF (Compact Flash (registered trademark)) card standards may be used. Furthermore, if the interfaces 90 and 94 and connectors 92 and 96 are compliant with the PCMCIA card standards or CF (Compact Flash (registered trademark)) card standards, communications cards can be connected. By connecting communications cards, it is possible to transfer image data and attached management information to/from other computers and peripherals such as printers. Available communications cards include LAN cards, modem cards, USB cards, IEEE 1394 cards, P1284 cards, SCSI cards, and PHS.

The protective member 102 is a barrier which covers the image sensing unit including the taking lens 10 and thereby protects them from contamination and breakage. Reference numeral 104 denotes the optical viewfinder. It is possible to shoot using only the optical viewfinder 104 without using the electronic viewfinder function of the image display unit 28. Also, some functions of the display unit 54 are provided in the optical viewfinder 104, including in-focus display, camera shake warning display, flash charging display, shutter speed display, f-stop display, and exposure correction display.

The image display unit open/close detecting unit 106 can also detect whether the image display unit 28 is in a stored state in which it is stored with its display screen facing the digital camera 100. By stopping display operation of the image display unit 28 upon detecting such a stored state, it is possible to prevent unnecessary power consumption.

Communications control units 111 and 113 have RS-232C, USB, IEEE 1394, P1284, SCSI, modem, LAN, wireless, and other communications functions. A connector 112 is used to link the digital camera 100 with other devices by USB, IEEE 1394, or other wired connections for the communications control unit 111. An antenna 114 is used for wireless connections in IEEE 802.11b, IEEE 802.11g, and other wireless LAN communications, Bluetooth and other spread-spectrum communications, IrDA and other infrared communications, and the like. It is assumed here that both wired and wireless connectors are included in the system configuration, but it is all right if only wired or wireless connectors are included in the system configuration.

Also, as described above, the system may be configured to communicate with external devices by connecting communications cards to the interfaces 90 and 94 and connectors 92 and 96. Available communications cards include LAN cards, modem cards, USB cards, IEEE 1394 cards, P1284 cards, SCSI cards, and PHS. Reference numeral 200 denotes a detachable recording medium such as a memory card, Compact Flash (registered trademark) card, or hard disk. The recording medium 200 has a recording unit 202 which consists of a semiconductor memory, magnetic disk, or the like; interface 204 to the digital camera 100; and connector 206 for connection with the digital camera 100. Reference numeral 210 denotes a recording medium such as a memory card or hard disk. The recording medium 210 has a recording unit 212 which consists of a semiconductor memory, magnetic disk, or the like; interface 214 to the digital camera 100; and connector 216 for connection with the digital camera 100.

Reference numeral 400 denotes the flash unit. Reference numeral 402 denotes a connector for connection with the accessory shoe of the digital camera 100. Reference numeral 404 denotes a flash. It is provided with an AF fill flash function and flash control function.

<<Operation of Digital Camera>>

Next, operation of the digital camera 100 according to this embodiment will be described with reference to FIGS. 2 to 15.

FIGS. 2 to 5 show flowcharts of a main routine of the digital camera 100 according to this embodiment.

At power-on after a battery replacement or the like, the system control unit 50 initializes flags, control variables, and the like in Step S101. In Step S102, the system control unit 50 initializes the image display in the image display unit 28 to an OFF state. In Step S103, the system control unit 50 determines the set position of the mode dial 60. If the mode dial 60 is set to Power-off, the system control unit 50 performs predetermined end-of-run processing in Step S105 and then returns to Step S103. In the end-of-run processing, the system control unit 50 changes the display in the display units to finished state and closes the barrier of the protective member 102 to protect the image sensing unit. Also, the system control unit 50 records flags, control variables, and other necessary parameters, setting values, and set modes in the non-volatile memory 56. Then, the system control unit 50 makes the power control unit 80 shut down power to various parts of the digital camera 100 which do not need power, including the image display unit 28.

Figure 5:
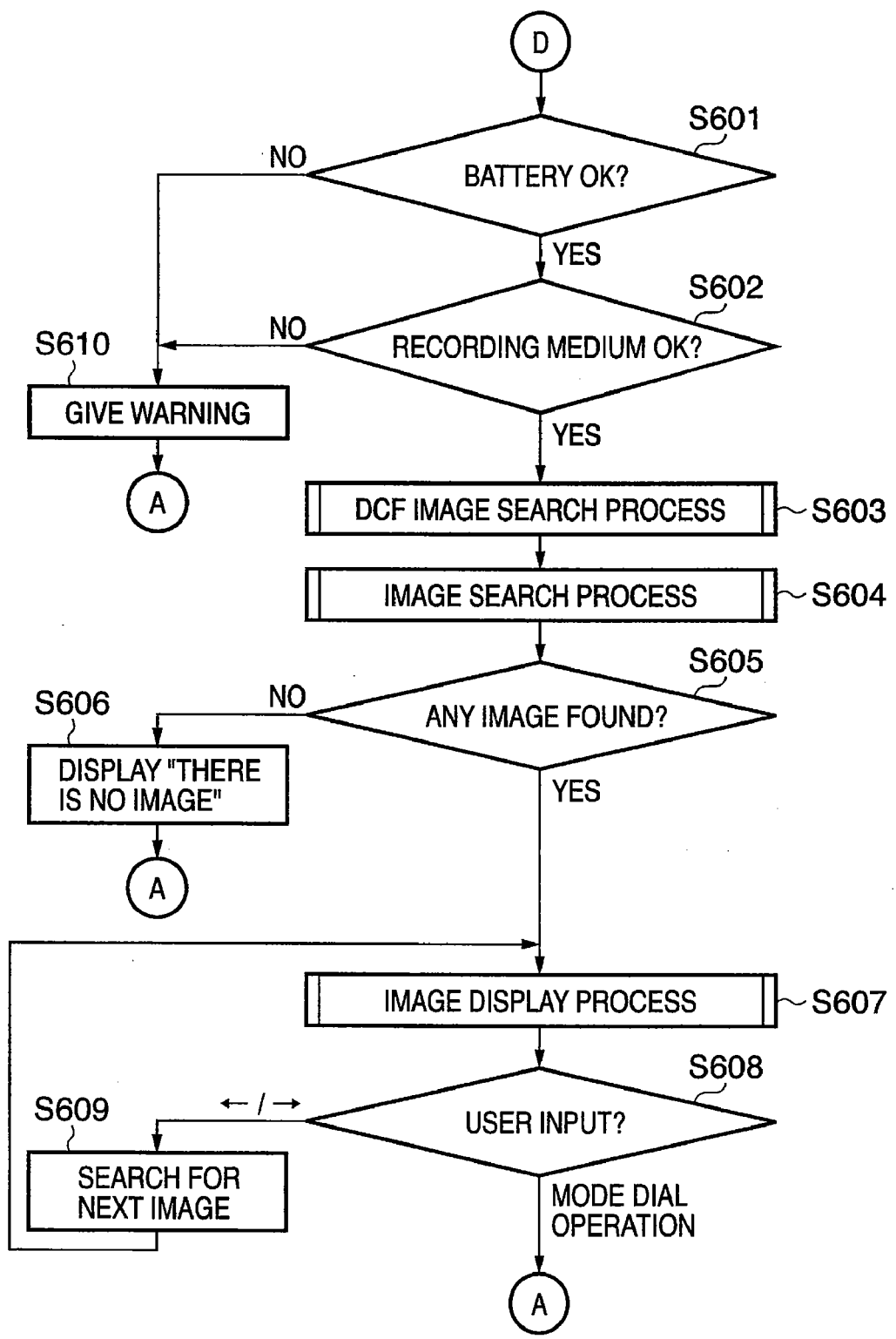
FIG. 5 is a flowchart of the main routine of the digital camera according to this embodiment.

If the mode dial 60 is set to Reproduction mode, the processing goes from Step S103 to Step S601 (FIG. 5). If the mode dial 60 is set to Shooting mode, the processing goes from Step S103 to Step S106.

In Step S106, the system control unit 50 makes the power control unit 80 determine whether the remaining power capacity or operating status of the power supply unit 86 consisting of a battery or the like obstructs the operation of the digital camera 100. If it is determined that the operation is obstructed, the system control unit 50 goes to Step S108 where it makes the display unit 54 display a predetermined warning using images and/or voice. Then, the processing returns to Step S103. If the power supply unit 86 is all right, the processing goes to Step S107. In Step S107, the system control unit 50 determines whether the operating state of the recording medium 200 or 210 obstructs the operation of the digital camera 100, particularly recording and reproduction of image data to/from the recording medium. If it is determined that the operation is obstructed, the system control unit 50 goes to Step S108 where it makes the display unit 54 display a predetermined warning using images and/or voice. Then, the processing returns to Step S103. If it is found that the operating state of the recording medium 200 or 210 is all right, the processing goes to Step S109.

In Step S109, the system control unit 50 checks the setting of the single shot/continuous shot switch 68 used to select between Single Shot and Continuous Shot. If Single Shot is selected, the system control unit 50 advances the processing to Step S110 to set a Single Shot/Continuous Shot flag to Single Shot. If Continuous Shot is selected, the system control unit 50 goes to Step S111 to set the Single Shot/Continuous Shot flag to Continuous Shot. When the Single Shot/Continuous Shot flag has been set in this way, the processing goes to Step S112. Incidentally, the use of the single shot/continuous shot switch 68 makes it possible to switch freely between the Single Shot mode which involves taking a single shot when the shutter switch 64 is turned on and then entering a standby state and the Continuous Shot mode which involves shooting continuously as long as the shutter switch 64 is ON. The state of the Single Shot/Continuous Shot flag is stored in an internal memory of the system control unit 50 or in the memory 52.

In Step S112, the system control unit 50 makes the display unit 54 display various settings of the digital camera 100 using images and/or voice. Incidentally, if the image display in the image display unit 28 is ON, the image display unit 28 also displays various settings of the digital camera 100.

Next, in Step S113, the system control unit 50 checks the setting of the image display ON/OFF switch 66. If the image display ON/OFF switch 66 is ON, the system control unit 50 goes to Step S114. In Step S114, the system control unit 50 makes the image display unit open/close detecting unit 106 determine whether the image display unit 28 is in a stored state in which it is stored with its display screen facing the digital camera 100 or in another state (Display mode). If it is determined that the image display unit 28 is in Display mode, the system control unit 50 sets an Image Display flag in Step S115 and turns on the image display in the image display unit 28 in Step S116. Furthermore, the system control unit 50 enters Live View Display mode in Step S117 to display picked-up images in sequence, and then goes to Step S131.

In Live View Display mode, the data written into the image display memory 24 in sequence via the image sensing element 14, the A/D converter 16, image processing circuit 20, and memory control circuit 22 is displayed in sequence by the image display unit 28 via the D/A converter 26. This implements an electronic viewfinder function. If it is found in Step S113 that the image display ON/OFF switch 66 is OFF or it is determined by the image display unit open/close detecting unit 106 in Step S114 that the image display unit 28 is in a stored state, the system control unit 50 goes to Step S118. The system control unit 50 clears the Image Display flag in Step S118, turns off the image display in the image display unit 28 in Step S119, and advances the processing to Step S131.

Incidentally, if the image display is OFF, the optical viewfinder 104 is used for shooting instead of the electronic viewfinder function of the image display unit 28. This reduces the power consumption of the image display unit 28, D/A converter 26, and the like which consume large amounts of power. The state of the Image Display flag is stored in the internal memory of the system control unit 50 or in the memory 52.

In Step S131, the system control unit 50 determines whether the shutter switch 62 (shutter switch signal SW1) is ON. If it is not ON, the processing returns to Step S103. If it is ON, the processing goes to Step S132. In Step S132, the system control unit 50 determines the state (set or cleared) of the Image Display flag stored in its internal memory or in the memory 52. If the Image Display flag is set, the system control unit 50 freezes image display in the image display unit 28 in Step S133 and advances the processing to Step S134. In the frozen state, rewriting of the image data in the image display memory 24 via the image sensing element 14, the A/D converter 16, image processing circuit 20, and memory control circuit 22 is inhibited. Then, the image data written last is displayed in the image display unit 28 via the memory control circuit 22 and D/A converter 26, thereby displaying the frozen video image in the electronic viewfinder (the image display unit 28). On the other hand, if the Image Display flag is cleared, the processing goes to Step S134 by skipping Step S133.

In Step S134, the system control unit 50 performs a distance measurement and metering process. That is, the system control unit 50 performs a distance measurement process and focuses the taking lens 10 on a subject. Also, the system control unit 50 performs a metering process and determines the f-stop number and shutter time (shutter speed) based on the exposure determined as a result of the metering process as well as on the current shooting operation mode. Incidentally, a flash setting is also made in the metering process as required. Details of the distance measurement and metering process will be described later with reference to FIG. 6.

When the distance measurement and metering process is finished, the system control unit 50 determines in Step S135 whether the set shutter speed exceeds maximum shutter time (measured in seconds and fractions of seconds) of the mechanical shutter. If it is determined that the maximum shutter speed is not exceeded, the system control unit 50 sets the shutter time (measured in seconds and fractions of seconds) of the mechanical shutter in Step S136, and then advances the processing to Step S138. If it is determined in Step S135 that the maximum shutter speed is exceeded, the system control unit 50 sets the shutter time (measured in seconds and fractions of seconds) for both mechanical shutter and electronic shutter in Step S137, and then advances the processing to Step S138. In this way, when the shutter speed to be set exceeds the maximum shutter time (measured in seconds and fractions of seconds) of the mechanical shutter, the electronic shutter is used in combination. This prevents the mechanical shutter from causing smear and at the same time, enables high shutter time (measured in seconds and fractions of seconds) by means of the electronic shutter.

If it is found in Steps S138 and S139 that the Image Display flag is set, the system control unit 50 puts the image display unit 28 in Live View Display mode in Step S139, and then advances the processing to Step S140.

Next, in Step S140, the system control unit 50 determines whether the shutter switch 64 (shutter switch signal SW2) is ON. If both shutter switches 64 and 62 are OFF (Steps S140 and S141), the processing returns to Step S103. On the other hand, if the shutter switch 64 is ON, the system control unit 50 determines the state of the Image Display flag in Step S142. If the Image Display flag is set, the system control unit 50 puts the image display unit 28 in Fixed-color Display mode in Step S143, and then goes to Step S161. In the Fixed-color Display mode, photographic image data written into the image display memory 24 via the image sensing element 14, A/D converter 16, image processing circuit 20, and memory control circuit 22 is not displayed. Instead, Fixed-color Display mode which replaces the photographic image data is displayed in the image display unit 28 via memory control circuit 22 and D/A converter 26. In this way, fixed-color video images are displayed in the electronic viewfinder. On the other hand, if the Image Display flag is not set, Step S143 is skipped.

Next, in Step S161, the system control unit 50 determines the state of the Single Shot/Continuous Shot flag stored in its internal memory or in the memory 52. If Single Shot is set, the processing goes to Step S162. If Continuous Shot is set, the processing goes to Step S181.

In Step S162, the system control unit 50 performs a shooting process including an exposure process and development process. In the exposure process, image data resulting from shooting is written into the memory 30 via the image sensing element 14, A/D converter 16, image processing circuit 20, and memory control circuit 22 or via the memory control circuit 22 directly from the A/D converter. In the development process, various processes are performed by reading image data out of the memory 30 using the memory control circuit 22 and, as required, the image processing circuit 20. Details of the shooting process will be described later with reference to FIG. 7.

Next, in Step S163, the system control unit 50 determines the state of the Image Display flag stored in its internal memory or in the memory 52. If the Image Display flag is set, the system control unit 50 reads image data for display out of the memory 30 in Step S164, where the image data for display has been processed according to display format of the image display unit 28. Then, the system control unit 50 transfers the image data for display to the image display memory 24 via the memory control circuit 22, displays it in the image display unit 28, and thereby presents a quick review display. The quick review display in Step S164 is referred to herein as a first quick review display. In the first quick review display, the image data for display is prepared using image data yet to undergo a dark correction computation because the first quick review display is presented before a dark capture process in Step S165.

In this way, in the Single Shot mode, in which the shooting process is performed prior to the dark capture process and image data yet to undergo dark correction is used for the first quick review display, it is possible to reduce a shutter release time lag and provide a quick review display immediately after shooting. Incidentally, in the first quick review display, since a dark capture process has not been performed yet, characters such as "Busy" are superimposed over the quick review image display.

On the other hand, if it is determined in Step S163 that the Image Display flag is cleared, the processing goes to Step S165, with the image display unit 28 remaining OFF. In that case, the image display unit 28 remains OFF and provides no quick review display even after shooting. The user cannot check the image just shot, but can continue shooting using the optical viewfinder 104. This method of use attaches importance to power saving by not using the electronic viewfinder function of the image display unit 28.

In Step S165, the system control unit 50 performs a dark capture process. In the dark capture process, the image sensing element 14 is charged for the same period of time as in actual shooting with the shutter 12 closed. Consequently, noise components such as dark current in the image sensing element 14 are accumulated for the same period of time as in actual shooting. The accumulated noise image signals are read out as dark image data. By performing a corrective computation process using dark image data captured in the dark capture process, it is possible to correct image data resulting from shooting for degradation in image quality such as dark current noise produced in the image sensing element 14 or pixel loss due to flaws intrinsic to the image sensing element 14. Details of the dark capture process S165 will be described later with reference to FIG. 8.

In Step S166, the system control unit 50 performs a development process. First, the system control unit 50 reads part of image data out of a predetermined area of the memory 30 via the memory control circuit 22. Then, it performs a WB (white balance) integration process and OB (optical black) integration process needed for the development process and stores computational results in its internal memory or in the memory 52. The system control unit 50 reads photographic image data out of the memory 30 using the memory control circuit 22 and image processing circuit 20 and performs various development processes including AWB (auto white balance) process, gamma conversion process, and color conversion process using the computational results. At the same time, in the development process, the system control unit 50 performs a subtraction process using the dark image data captured in the dark capture process, and thereby performs a computational process for dark correction to cancel out the dark current noise in the image sensing element 14. Details of the development process will be described later with reference to FIG. 9.

In Step S167, the system control unit 50 makes the compression/decompression circuit 32 compress the image data written into the memory 30 according to the set mode. Next, in Step S168, the system control unit 50 records shooting information such as a shooting date/time, model ID of the camera, and color effect mode used during shooting in an Exif header. Image data which has undergone a series of processes after shooting is written into free space in an image storage buffer area of the memory 30. Next, in Step S169, the system control unit 50 performs a recording process which involves reading out the image data stored in the image storage buffer area of the memory 30 and recording it in the recording medium 200 (210) via the interface 90 (94) and connector 92 (96).

Incidentally, while image data is being written into the recording medium 200 (210), for example, a LED is made to blink in the display unit 54 to indicate clearly that a write operation is being executed. In Step S170, the system control unit 50 determines the state of the Image Display flag. If the Image Display flag is set, the system control unit 50 goes to Step S171 to transfer the image data for display from the memory 30 to the image display memory 24 via the memory control circuit 22 and display it in the image display unit 28, where the image data for display has been processed according to the display format of the image display unit 28. This display is referred to herein as a second quick review display. In the second quick review display, the image data for display is prepared using image data which has undergone a dark correction computation in the development process in Step S166 because the second quick review display is presented after the dark capture process in Step S165.

In this way, in the Single Shot mode, the shooting process is performed prior to the dark capture process and the first quick review display is presented using the image data yet to undergo dark correction. After the dark capture process, the second quick review display is presented using the image data subjected to dark correction. This makes it possible to reduce a shutter release time lag and provide a quick review display immediately after shooting.

Incidentally, in the second quick review display in Step S171, since the dark capture process has already been performed, the characters such as "Busy" displayed in the first quick review display is erased.

In Step S170, if the Image Display flag is cleared, the processing goes to Step S172, with the image display unit 28 remaining OFF. In that case, the image display unit 28 remains OFF and provides no quick review display even after shooting. As described above, this method of use attaches importance to saving power by not using the electronic viewfinder function of the image display unit 28.

Next, in Step S172, the system control unit 50 waits until the shutter switch 62 is turned off. When the shutter switch 62 is turned off, the system control unit 50 goes to Step S173 to determine the state of the Image Display flag. If the Image Display flag is set, the system control unit 50 goes to Step S174 to put the image display unit 28 in Live View Display mode. When a sequence of shooting operations are finished, the processing returns to Step S103. In this case, after the user checks the shot image through the quick review display in the image display unit 28, Live View Display mode is entered automatically to display picked-up image data in sequence for a next shot. If it is found in Step S173 that the Image Display flag is cleared, the system control unit 50 finishes the sequence of shooting operations with the image display unit 28 remaining OFF, and then returns to Step S103.

If it is determined in Step S161 that Continuous Shot is set in the Single Shot/Continuous Shot flag, the system control unit 50 goes to Step S181. In Step S181, the system control unit 50 performs a dark capture process as in the case of Step S165, and then goes to Step S182. As described above, by performing a corrective computation process using dark image data captured in the dark capture process, it is possible to correct image data resulting from shooting for degradation in image quality such as dark current noise produced in the image sensing element 14 or pixel loss due to flaws intrinsic to the image sensing element 14. Details of the dark capture process S181 will be described later with reference to FIG. 8.

Next, in Step S182, the system control unit 50 performs a shooting process including an exposure process and development process in a manner similar to Step S162. Incidentally, details of the shooting process will be described later with reference to FIG. 7.

Next, in Step S183, the system control unit 50 performs a development process similar to Step S166. That is, the system control unit 50 reads part of image data out of a predetermined area of the memory 30 via the memory control circuit 22 and performs a WB (white balance) integration process and OB (optical black) integration process needed for the development process. Then, it stores the computational results in its internal memory or in the memory 52. Then, the system control unit 50 makes the memory control circuit 22 and image processing circuit 20 perform various development processes including AWB (auto white balance) process, gamma conversion process, and color conversion process on the photographic image data in the memory 30 using the computational results. At the same time, in the development process, the system control unit 50 performs a subtraction process using the dark image data captured in the dark capture process, and thereby performs a computational process for dark correction to cancel out the dark current noise in the image sensing element 14. Details of the development process in Step S183 will be described later with reference to FIG. 9.

In Step S184, the system control unit 50 determines the state of the Image Display flag stored in its internal memory or in the memory 52. If the Image Display flag is set, the system control unit 50 advances the processing to Step S185. In Step S185, the system control unit 50 reads image data for display out of the memory 30, transfers it to the image display memory 24 via the memory control circuit 22, and displays it in the image display unit 28, where the image data for display has been processed according to the display format of the image display unit 28. This display is referred to herein as a third quick review display. In the third quick review display, the image data for display is prepared using image data which has undergone a dark correction computation in the development process in Step S183 because the third quick review display is presented after the dark capture process in Step S181.

In this way, in the Continuous Shot mode, the quick review display is presented using the image data subjected to dark correction. This makes it possible to keep shot intervals after the second shot almost constant and provide a quick review display immediately after shooting.

If it is found in Step S184 that the Image Display flag is cleared, the system control unit 50 goes to Step S186, with the image display unit 28 remaining OFF. In this case, the image display unit 28 remains OFF and does not provide the third quick review display even after shooting. Thus, the method of use which attaches importance to saving power is implemented.

Next, in Step S186, the system control unit 50 reads the image data out of the memory 30 and makes the compression/decompression circuit 32 compress the image data according to the set mode. In Step S187, the system control unit 50 records shooting information such as a shooting date/time, model ID of the camera, and color effect mode used during shooting in an Exif header. In Step S188, the system control unit 50 determines whether there is free space in an image storage buffer area of the memory 30. If it is determined that there is free space, the system control unit 50 writes the compressed image data into the memory 30 in sequence in Step S189a. On the other hand, if it is determined that there is no free space in the image storage buffer area of the memory 30, the system control unit 50 goes to Step S189b to perform a recording process. In the recording process, the system control unit 50 reads out the image data stored in the image storage buffer area of the memory 30 and records it in a recording medium 200 (210) such as a memory card or CompactFlash (registered trademark) card via the interface 90 (94) and connector 92 (96).

In the above processes, if more than a predetermined number of continuous shots are taken, resulting in a shortage of the image storage buffer area, free space is created in the image storage buffer area as a result of the recording process, making it possible to resume continuous shooting.

Incidentally, during the recording process in Step S189b, the image display unit 28 or display unit 54 may display a predetermined warning as appropriate using images and/or voice (warning display indicating that the buffer is full).

In Step S190, it is determined whether or not the shutter switch 64 is ON. If it is ON, the processing returns to Step S182, where a series of continuous shots are repeated as described above. If it is determined that the shutter switch 64 is OFF, the processing goes to Step S191, where the system control unit 50 determines whether the shutter switch 62 is ON or OFF. If it is found in Step S191 that the shutter switch 62 is ON, the processing returns to Step S190. If the shutter switch 64 is turned on again in this state, the processing returns to Step S182, where the system control unit 50 resumes the continuous shooting.

If it is found in Step S191 that the shutter switch 62 is OFF, the processing goes to Step S192. In Step S192, the system control unit 50 performs a recording process which involves reading out the image data stored in the image storage buffer area of the memory 30 and recording it in the recording medium 200 (210) via the interface 90 (94) and connector 92 (96). Incidentally, while image data is being written into the recording medium 200 (210), for example, a LED may be made to blink in the display unit 54 to indicate clearly that a write operation is being executed. When the recording process is finished, the processing goes to Step S173.

On the other hand, if it is determined in Step S103 that the mode dial 60 is set to Reproduction mode, the processing goes to Step S601. In Step S601, the system control unit 50 makes the power control unit 80 determine whether the remaining power capacity or operating status of the power supply unit 86 consisting of a battery or the like obstructs the operation of the digital camera 100. If it is determined that the operation is obstructed, the system control unit 50 goes to Step S610 where it makes the display unit 54 display a predetermined warning using images and/or voice. Then, the processing returns to Step S103. If the power supply unit 86 is all right, the system control unit 50 determines in Step S602 whether the operating state of the recording medium 200 or 210 obstructs the operation of the digital camera 100, particularly recording and reproduction of image data to/from the recording medium. If it is determined that the operation is obstructed, the system control unit 50 goes to Step S610 where it makes the display unit 54 display a predetermined warning using images and/or voice. Then, the processing returns to Step S103.

If it is found in Step S602 that the operating state of the recording medium 200 or 210 is all right, the processing goes to Step S603. In Step S603, the system control unit 50 performs a DCF image search process described later with reference to FIG. 16. Next, in Step S604, the system control unit 50 performs an image search process (image search other than DCF) described later with reference to FIG. 11. If it is determined in Step S605 that the search processes in Steps S603 and S604 found no image, the processing goes to Step S606. In Step S606, the system control unit 50 displays a message "There is no image," and then returns the processing to Step S103.

On the other hand, if it is determined that there is an image, the processing goes to Step S607. In Step S607, the system control unit 50 displays, in the image display unit 28, the image determined as the last image in the image search process of Step S604. Details of the image display process in Step S607 will be described later. In the display process, files registered in a file list (described later) generated in the image search process of Step S604 are selected and displayed one after another in the order in which they are listed in the file list. When the sequence of selections from the file list are finished, the files retrieved in the DCF image search process of Step S603 may be selected and displayed one after another in the order specified by DCF.

Next, in Step S608, the system control unit 50 enters a state of waiting for user input. If the mode dial 60 is operated, the processing returns to Step S103. If a left/right button in the control panel 70 is operated, the system control unit 50 searches for the next image in Step S609, displays a retrieved image in Step S607, and enters a state of waiting for user input again in Step S608. Incidentally, in the next-image search in Step S609, either the next image or previous image in the file list is retrieved according to operation of the left/right button. Also, when the next image or previous image in the file list reaches the leading end or terminal end, the files retrieved in the DCF image search process (Step S603) may be retrieved one after another in the order specified by DCF.

<<Distance Measurement and Metering Process (S134)>>

Figure 3:
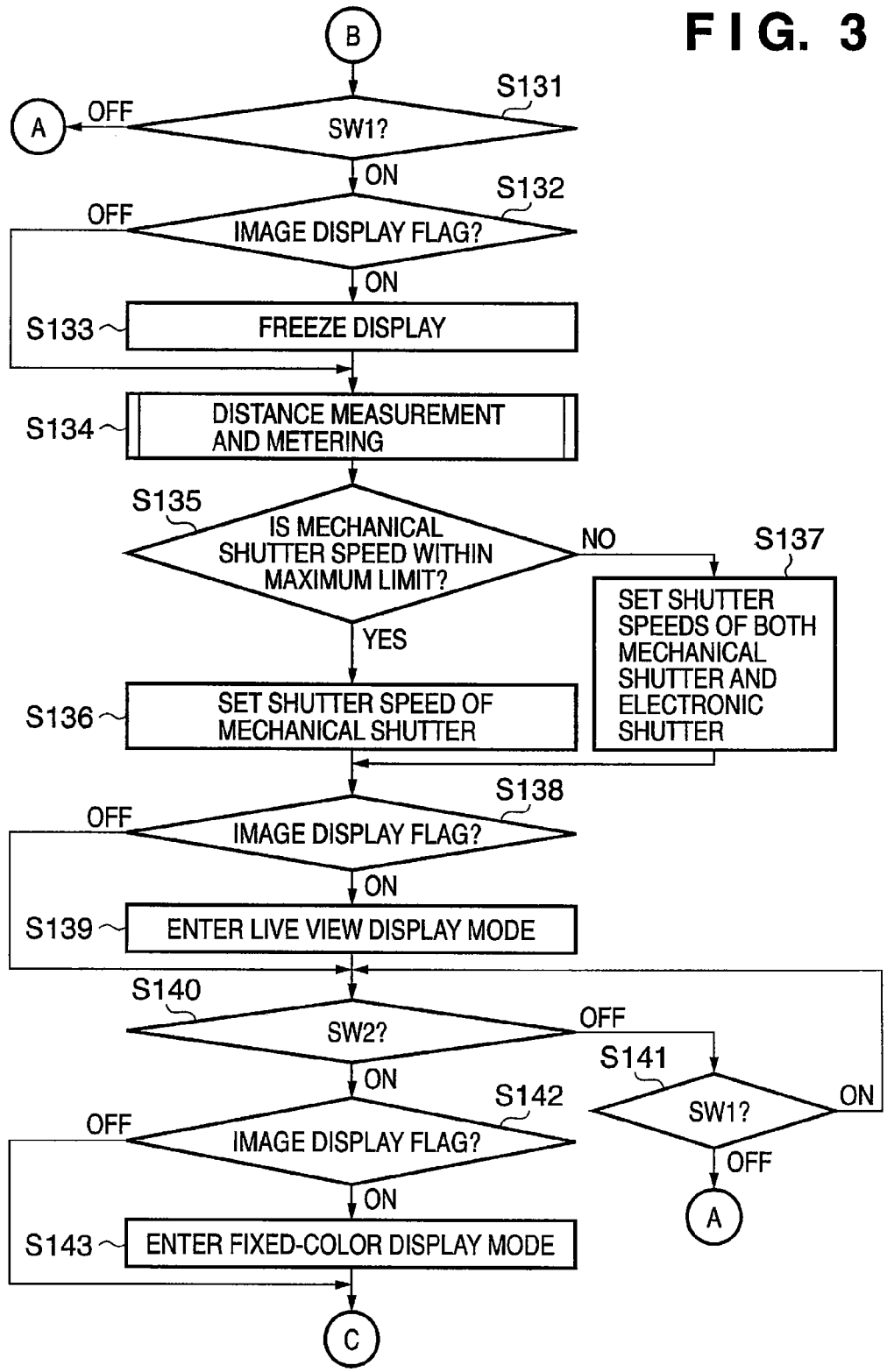
FIG. 3 is a flowchart of the main routine of the digital camera according to this embodiment.
Figure 6:
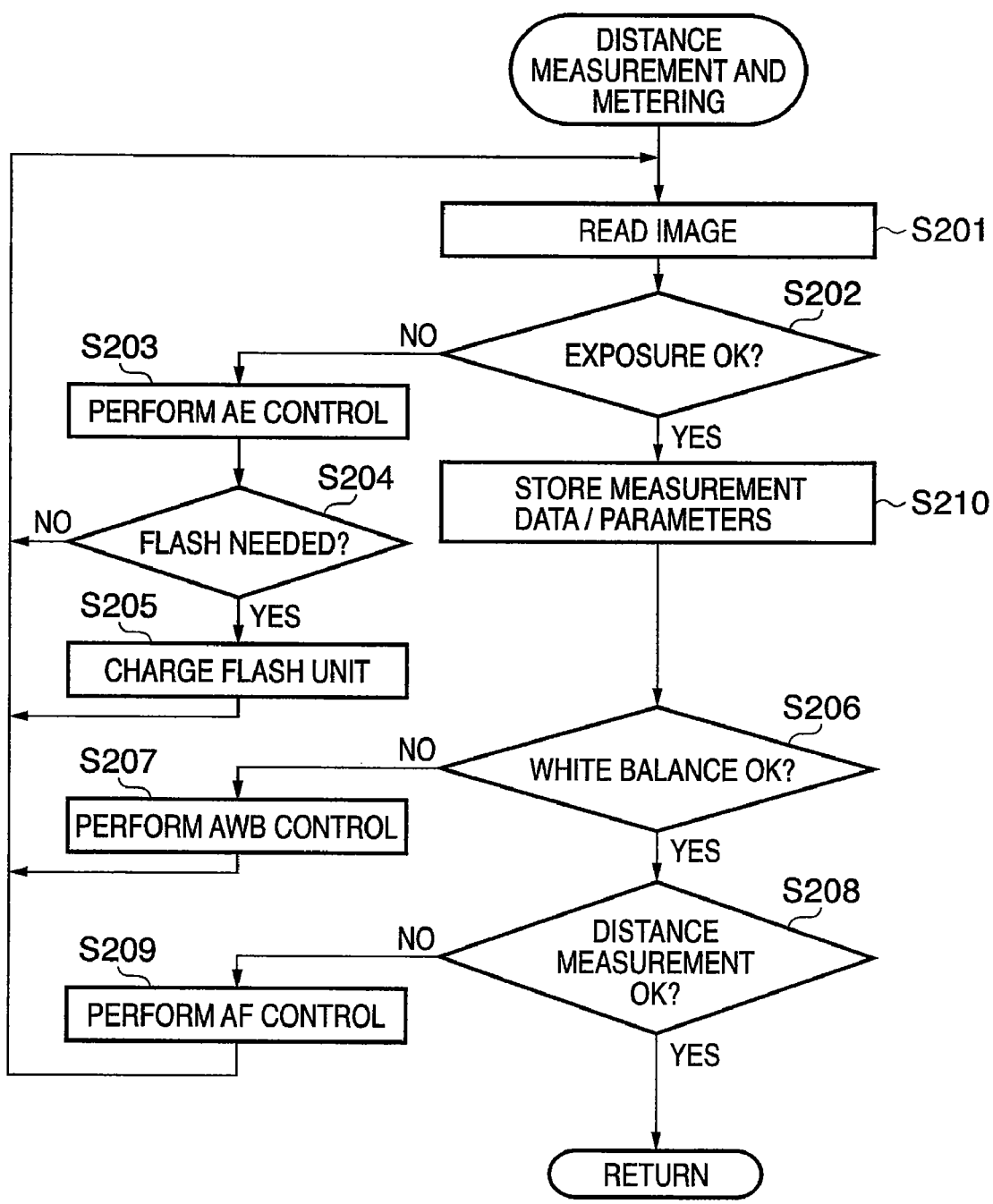
FIG. 6 is a flowchart of the metering and distance measurement process according to this embodiment.

FIG. 6 is a flowchart showing detailed procedures of the distance measurement and metering process in Step S134 of FIG. 3.

In Step S201, the system control unit 50 reads a charge signal from the image sensing element 14, converts it into image data by means of the A/D converter 16, and supplies the image data sequentially to the image processing circuit 20. Using the image data supplied sequentially, the image processing circuit 20 carries out predetermined computations used for a TTL AE process, EF process, and AF process. Incidentally, in these processes, specific part extracted, as required, from all the pixels resulting from shooting is used for computations. This makes it possible to perform optimal computations for each of different modes—including center-weighted mode, averaging mode, and evaluation mode—in the TTL AE, EF, AWB, and AF processes.

Next, in Step S202, the system control unit 50 determines whether or not the exposure (AE) is appropriate, using computational results of the image processing circuit 20. The processes in Steps S203 to S205 and S201 are repeated until it is determined in Step S202 that the exposure is appropriate. In Step S203, the system control unit 50 performs AE control using the exposure control unit 40. Then, in Step S204, the system control unit 50 determines whether or not a flash is needed, using measurement data obtained in the AE control. If a flash is needed, the system control unit 50 sets a Flash flag and charges the flash unit 400 in Step S205. Then, it returns the processing to Step S201.

If the exposure (AE) is determined to be appropriate in Step S202, the system control unit 50 stores measurement data and/or set parameters in its internal memory or in the memory 52 in Step S210.

Next, in Step S206, the system control unit 50 determines whether or not white balance (AWB) is appropriate, using the computational results produced by the image processing circuit 20 and measurement data obtained in the AE control. The processes in Step S201 and subsequent steps are repeated until the white balance is determined to be appropriate. In Step S207, the system control unit 50 adjusts color processing parameters using the image processing circuit 20 and performs AWB control. The system control unit 50 stores measurement data and/or set parameters in its internal memory or in the memory 52.

If it is determined in Step S206 that the white balance (AWB) is appropriate, the processing goes to Step S208. In Step S208, using the measurement data obtained in the AE control and AWB control, the system control unit 50 determines whether focus has been achieved by means of distance measurement (AF). If focus has not been achieved, AF control is performed using the distance measurement control unit 42 in Step S209. The system control unit 50 stores measurement data and/or set parameters in its internal memory or in the memory 52. If it is determined in Step S208 that focus has been achieved, the distance measurement and metering routine S134 ends.

<<Shooting Process (S162 and S182)>>

Figure 4A:
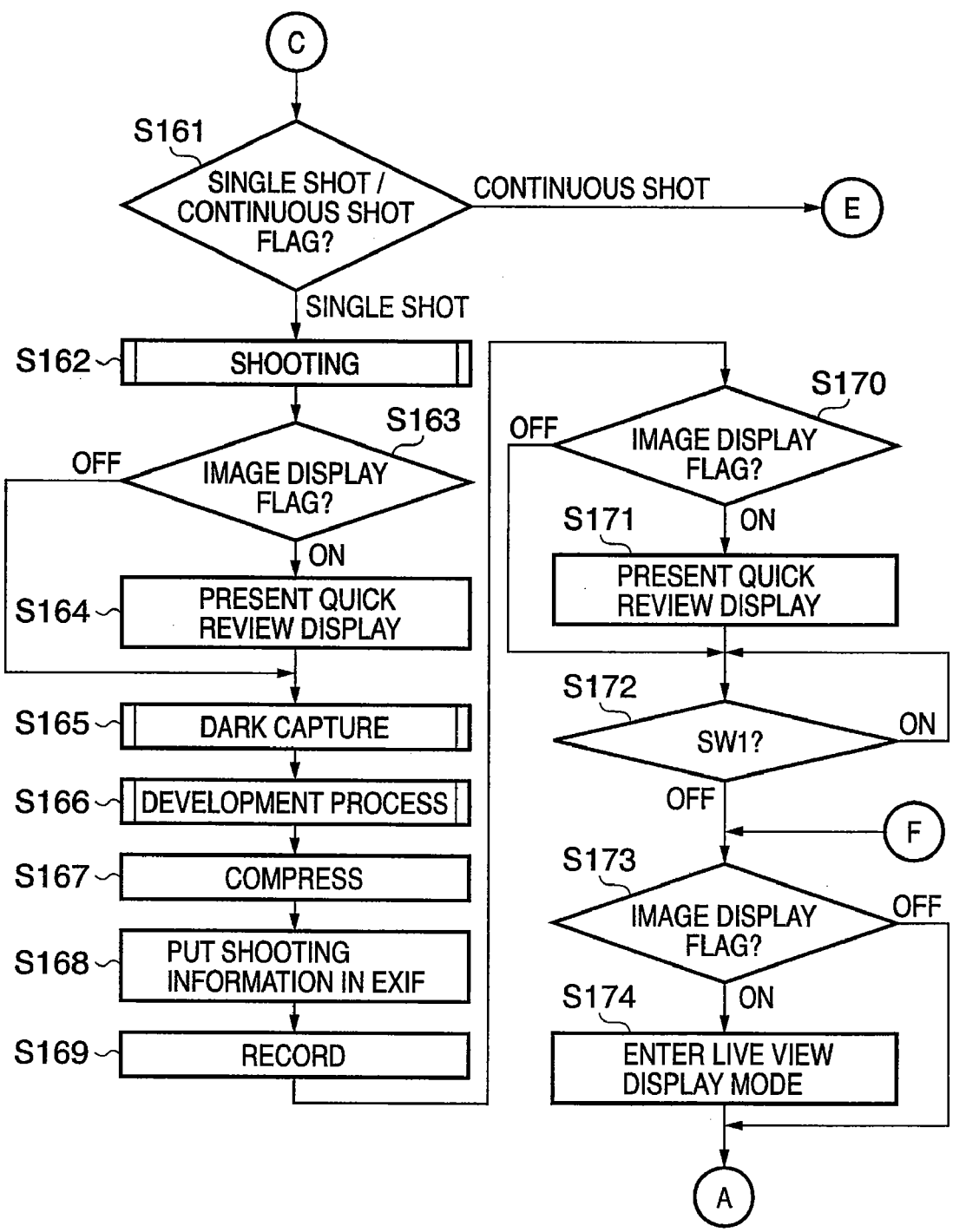
FIGS. 4A and 4B are flowcharts of the main routine of the digital camera according to this embodiment.
Figure 4B:
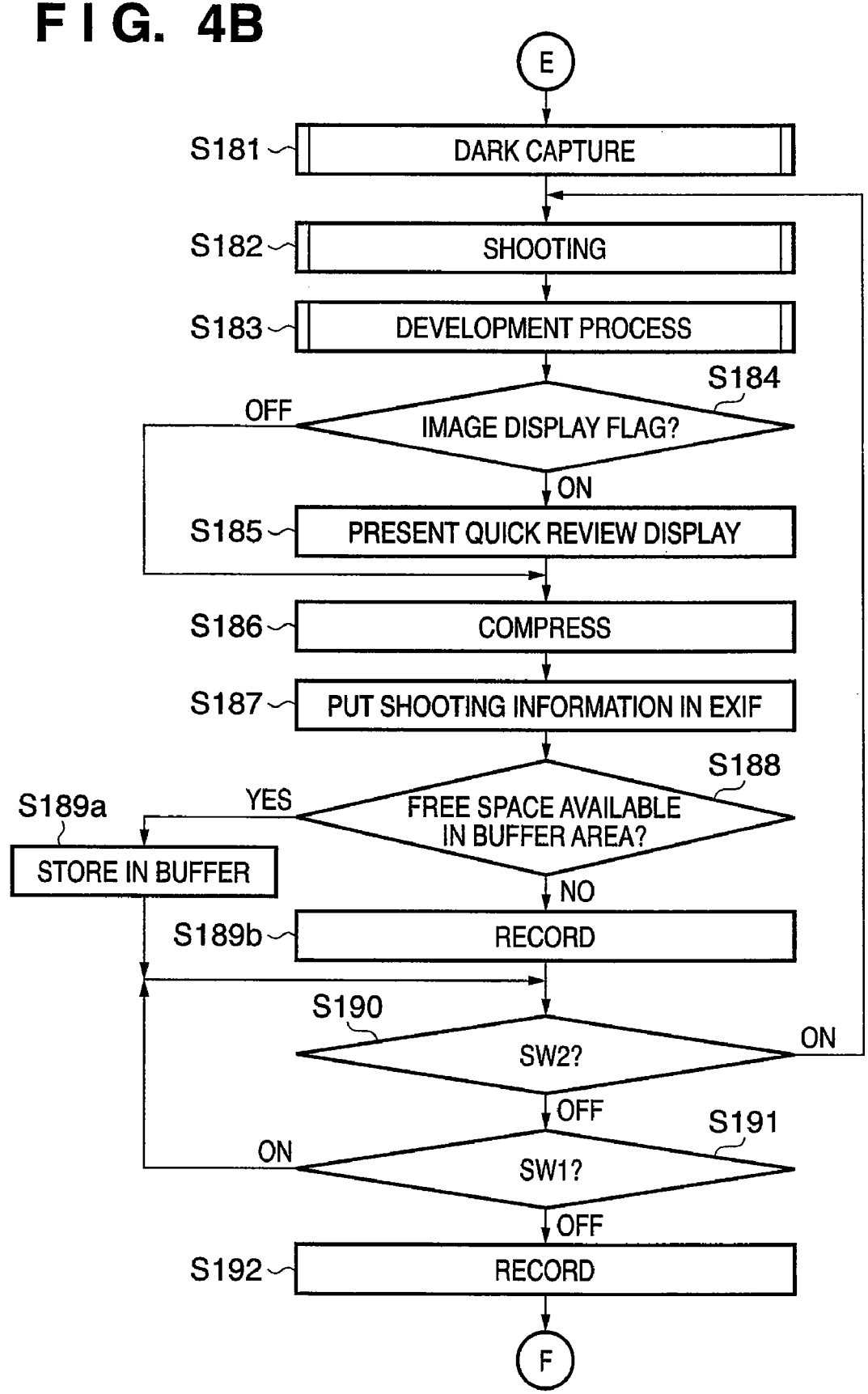
Figure 7:
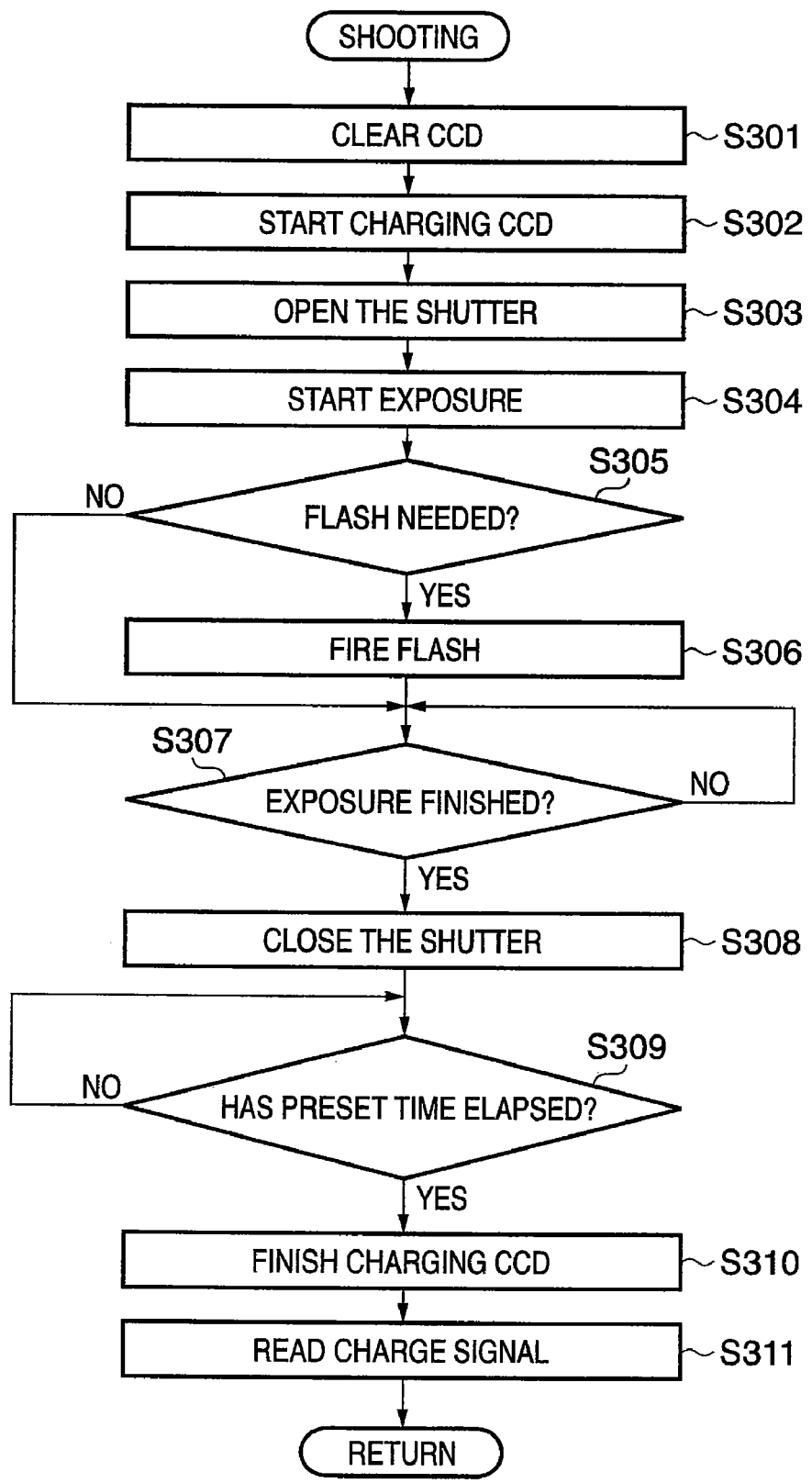
FIG. 7 is a flowchart of a shooting process according to this embodiment.

FIG. 7 is a flowchart showing details of the shooting process in Steps S162 and S182 in FIGS. 4A and 4B.

The system control unit 50 removes charges from the image sensing element 14 in Step S301 and starts storing charges in the image sensing element 14 in Step S302. The system control unit 50 makes the exposure control unit 40 open the shutter 12 in Step S303 and start exposing the image sensing element 14 (Step S304). In Step S305, the system control unit 50 checks the Flash flag to determine whether it is necessary to fire the flash unit 400. If it is determined to be necessary, the system control unit 50 fires the flash unit 400 in Step S306. Incidentally, if it is not necessary to fire the flash unit 400 or if the flash unit 400 is unavailable for use, the system control unit 50 goes to Step S307.

In Step S307, the system control unit 50 waits for the exposure of the image sensing element 14 to finish, based on metering data. When the exposure is finished, the system control unit 50 makes the exposure control unit 40 close the shutter 12 in Step S308, thereby finishing the exposure of the image sensing element 14.

If it is determined in Step S309 that a preset charge storage time has elapsed, the system control unit 50 finishes storing charges in the image sensing element 14 in Step S310. In Step S311, the system control unit 50 reads a charge signal from the image sensing element 14 and converts it into image data by means of the A/D converter 16. Then, it writes the image data into the memory 30 via the image processing circuit 20 and the memory control circuit 22 or directly via the memory control circuit 22. When the series of processes are finished, the shooting process in Steps S162 and S182 is finished.

<<Dark Capture Process (S165 and S181)>>

Figure 8:
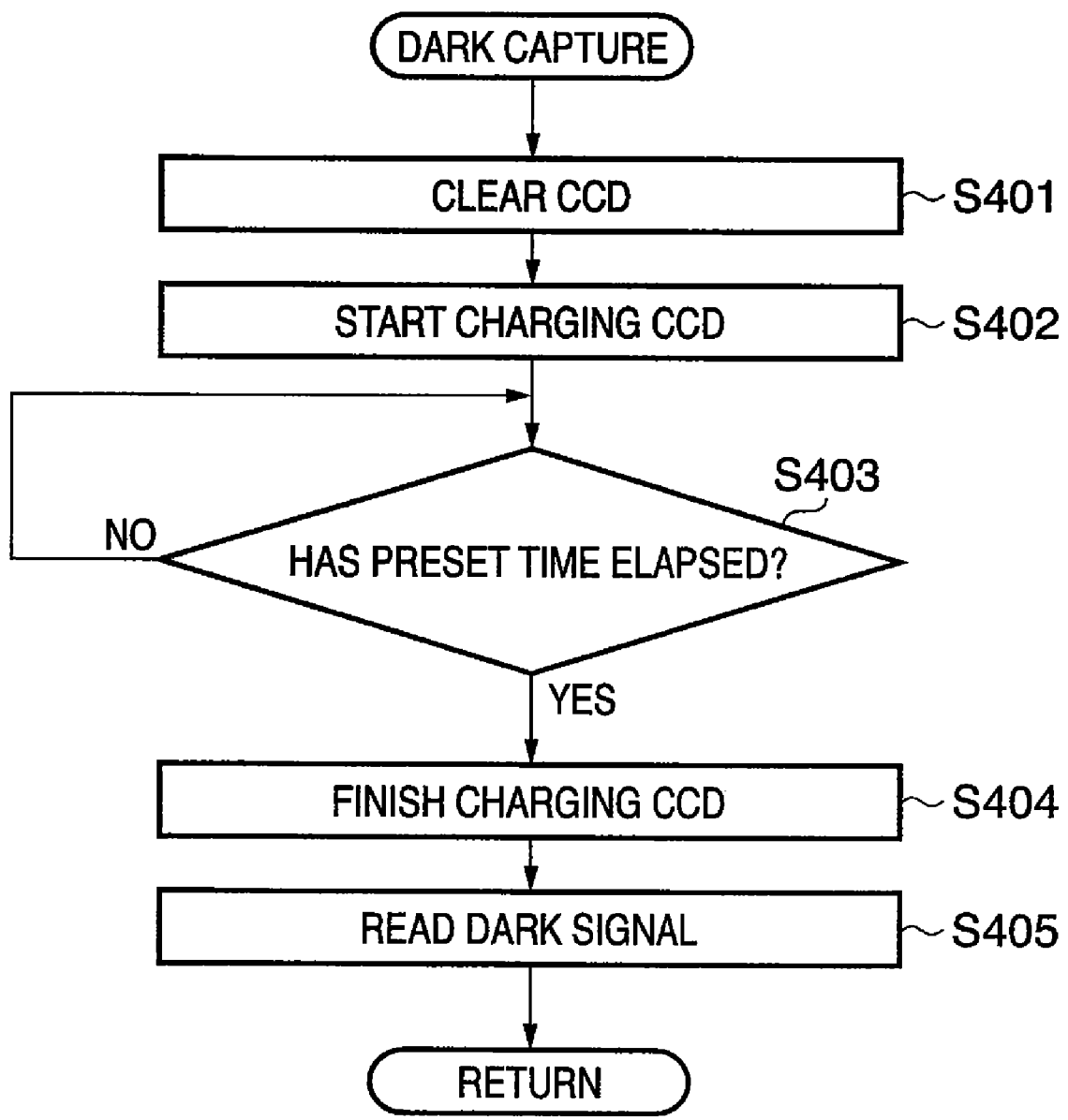
FIG. 8 is a flowchart of a dark capture process according to this embodiment.

FIG. 8 is a flowchart showing details of the dark capture process in Steps S165 and S181 in FIGS. 4A and 4B.

The system control unit 50 removes charges from the image sensing element 14 in Step S401 and starts storing charges in the image sensing element 14, with the shutter 12 closed, in Step S402. In Step S403, the system control unit 50 determines whether a predetermined charge storage time has elapsed. If it has, the system control unit 50 finishes storing charges in the image sensing element 14 in Step S404 and reads a charge signal from the image sensing element 14 in Step S405. The charge signal read out is converted into dark image data by the A/D converter 16 and written into a predetermined area of the memory 30 via the image processing circuit 20 and the memory control circuit 22 or directly via the memory control circuit 22.

By performing a development process using the dark capture data, it is possible to correct image data resulting from shooting for degradation in image quality such as dark current noise produced in the image sensing element 14 or pixel loss due to flaws intrinsic to the image sensing element 14.

The dark image data is stored in the predetermined area of the memory 30 until a new dark capture process is performed or the digital camera 100 is powered off. Alternatively, all or part of the memory 30 may be composed of a non-volatile memory such as an EEPROM or hard disk and the dark image data may be written into the non-volatile memory. In that case, the dark image data will be held in a predetermined area of the non-volatile memory until a new dark capture process is performed regardless of whether the power is turned on or off. The dark image data is used in a development process of image data obtained after a shooting process. When the series of processes in FIG. 8 are finished, the dark capture process in Steps S165 and S181 are finished.

<<Development Process (S166 and S183)>>

Figure 9:
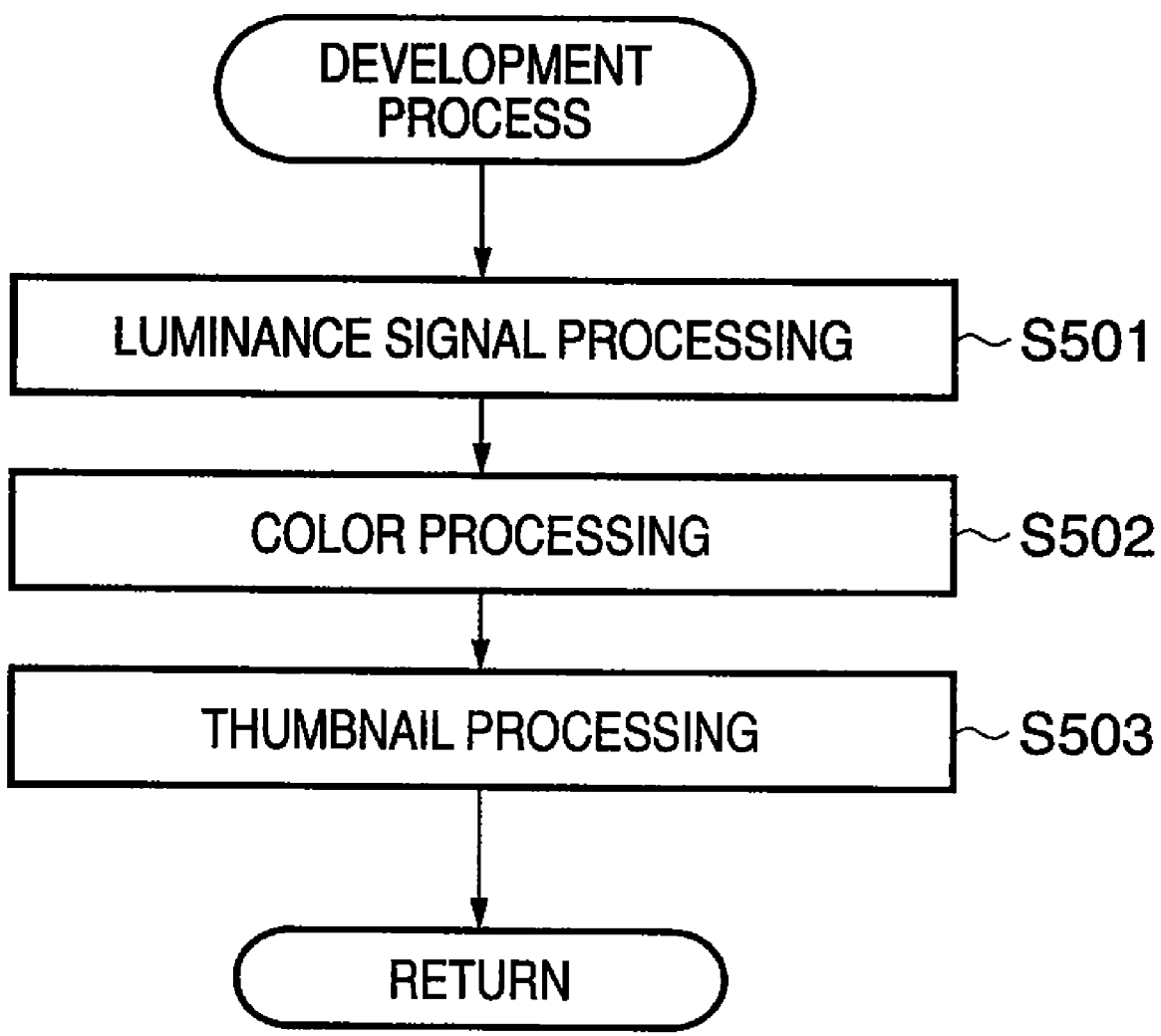
FIG. 9 is a flowchart of a development process according to this embodiment.

FIG. 9 is a flowchart showing details of the development process in Steps S166 and S183 in FIGS. 4A and 4B.

The system control unit 50 performs luminance signal processing in Step S501 by reading the photographic image data and dark image data out of the memory 30 and performs color processing in Step S502 according to a set color effect mode. Then, in Step S503, the system control unit 50 performs thumbnail processing and writes the processed image data in the memory 30. When the series of processes are finished, the development process in Steps S166 and S183 are finished.

<<DCF Image Search Process (S603)>>

Figure 16:
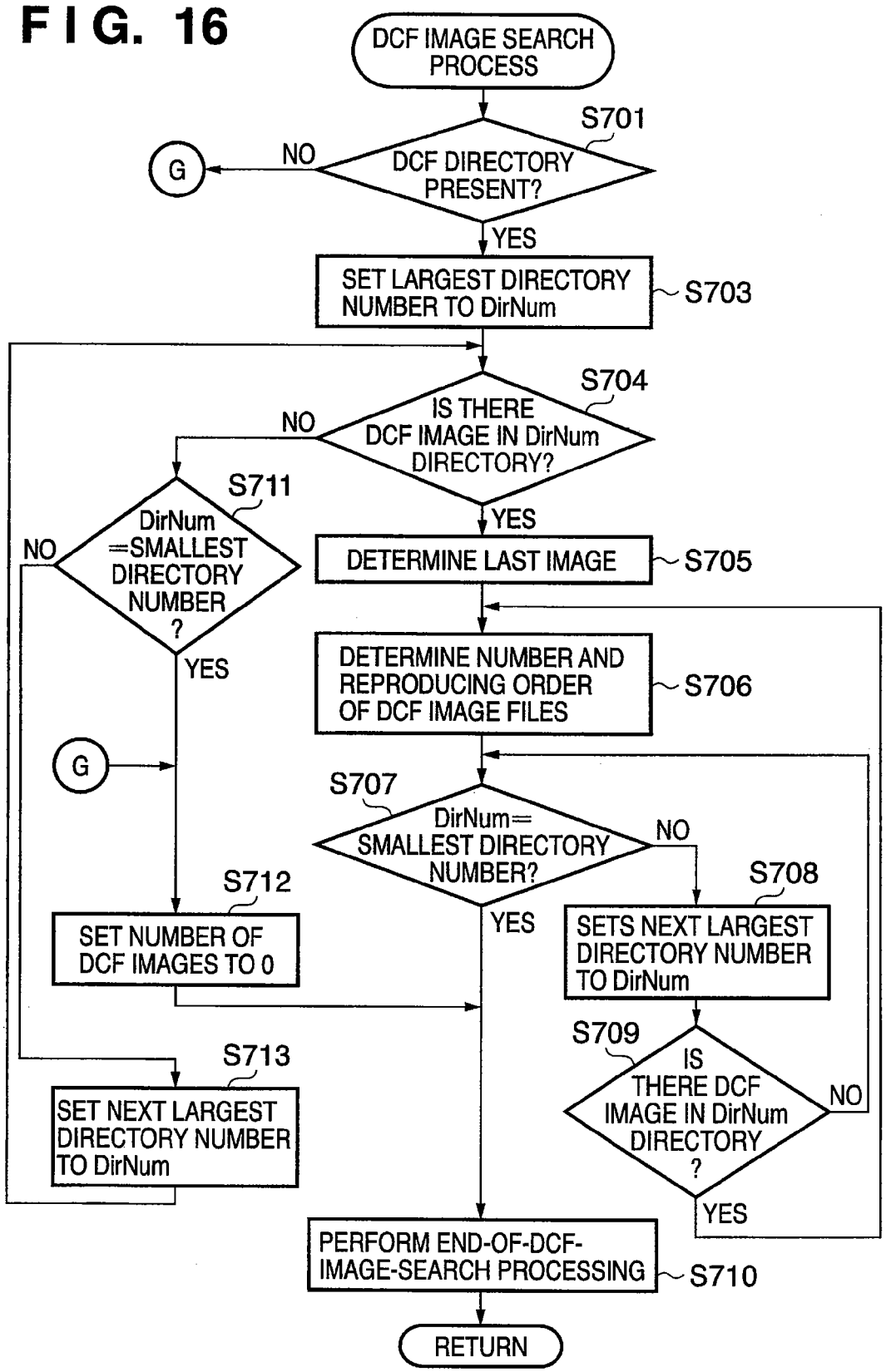
FIG. 16 is a flowchart illustrating a DCF image search process according to this embodiment.

FIG. 16 is a flowchart illustrating a DCF image search process (Step S603 in FIG. 5) according to this embodiment. In Step S701, the system control unit 50 determines whether a DCF directory exists in the recording medium 200 or 210. If it is determined that there is no DCF directory, the system control unit 50 sets the number of DCF images to 0 in Step S712, performs end-of-image-search processing in Step S710, and finishes the DCF image search process. Incidentally, the end-of-image-search processing involves setting an end-of-search flag, issuing an end-of-search event, and the like. The DCF directory is a standardized directory which has a name in "DCIM/xxxYYYY" format, where xxx is a directory number (numeric character string from 100 to 999) and YYYY is an ASCII character string.

If it is determined in Step S701 that there is a DCF directory, the system control unit 50 sets the largest directory number in the recording medium 200 or 210 to a variable DirNum in Step S703. In Step S704, the system control unit 50 determines whether there is an image in the DCF directory with DirNum. If it is determined that there is no image, the system control unit 50 determines in Step S711 whether the currently set DirNum is the smallest directory number in the recording media 200 and 210. If DirNum is not the smallest directory number, the processing goes to Step S713. In Step S713, the system control unit 50 sets the DCF directory with the next largest directory number in the recording medium 200 or 210 to DirNum. Next, the processing returns to Step S704. If it is determined in Step S711 that DirNum is the smallest directory number, this means that directory searches from the largest directory number to the smallest directory number have been finished without any image being detected. Thus, the system control unit 50 sets the number of DCF images to 0 in Step S712, performs end-of-image-search processing in Step S710, and finishes the DCF image search process.

On the other hand, if it is determined in Step S704 that there is any image, the processing goes to Step S705. In Step S705, the system control unit 50 determines the image as the last image (latest image). The system control unit 50 may display images in the image display unit 28 starting with the last image. At the same time, in Step S706, the system control unit 50 determines the total number and reproducing order of DCF image files in the DCF directory with DirNum and stores them in the memory 52. Incidentally, the reproducing order corresponds to the order of file numbers contained in file names compliant with the DCF standards. DCF image files have a name in "YYYYZZZZ.JPG" format, where YYYY is an ASCII character string and ZZZZ is a numeric character string from 0001 to 9999.

Next, in Step S707, the system control unit 50 determines whether or not the current DirNum is the smallest directory number in the recording unit. If it is not the smallest directory number, the system control unit 50 sets the next largest directory number to DirNum in Step S708 and determines whether or not there is any DCF image in this directory in Step S709. If there is any DCF image, the system control unit 50 returns the processing to Step S706. If there is no DCF image, the system control unit 50 returns the processing to Step S707. If the current DirNum matches the smallest directory number in Step S707, the system control unit 50 determines that the directories down to the smallest directory number have been searched for images, performs end-of-DCF-image-search processing in Step S710, and finishes the DCF image search process.

<<Image Search Process (S604)>>

Figure 11:
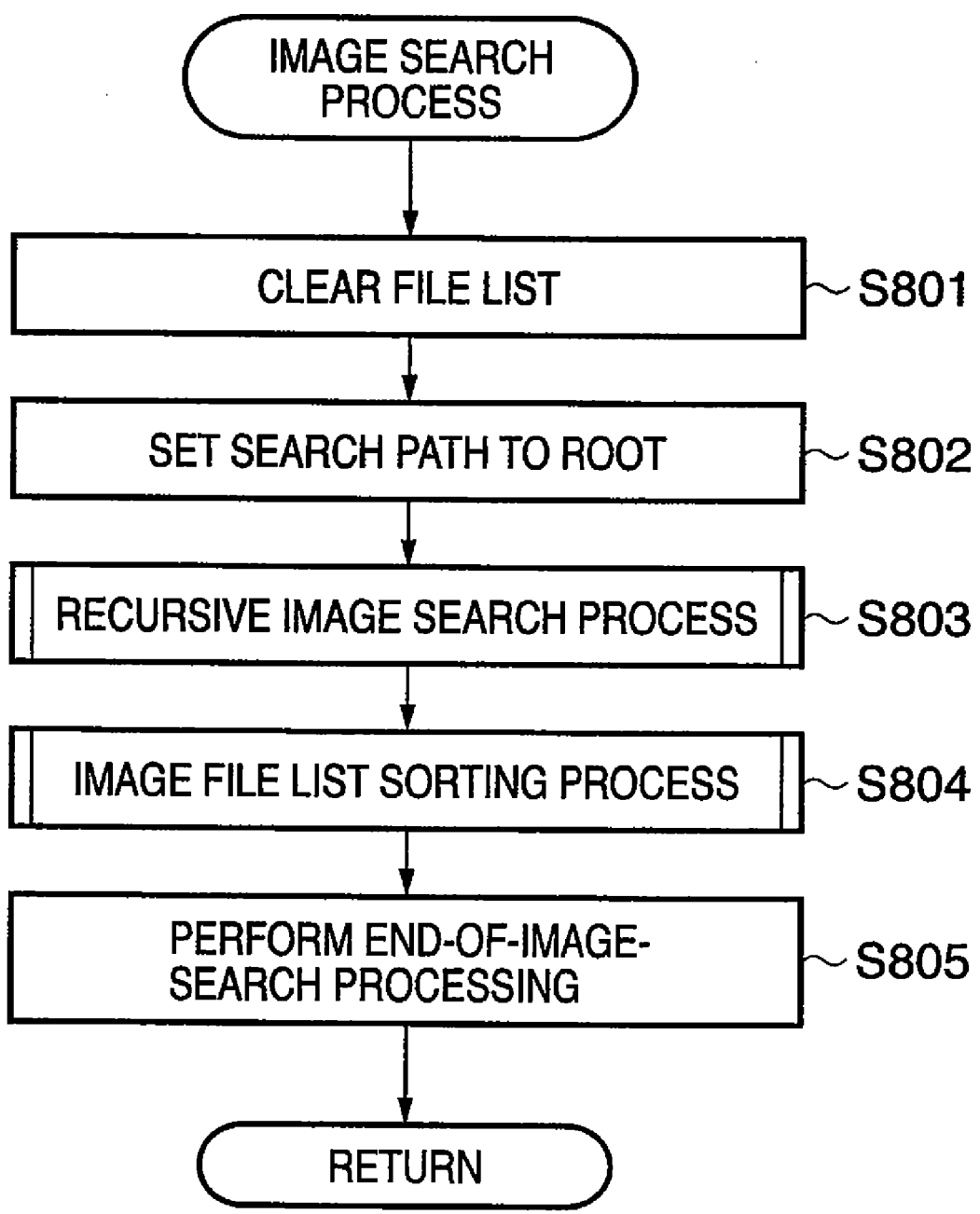
FIG. 11 is a flowchart of an image search process according to this embodiment.

FIG. 11 is a flowchart showing details of the non-DCF image search process in Step S604 of FIG. 5.

In Step S801, the system control unit 50 clears a list which manages images other than DCF images. As described later, the list is used for a rearrangement process to determine the reproducing order of retrieved images. It is stored in the memory 52. Hereinafter, it will be referred to as an image file list. In Step S802, the system control unit 50 sets a search start path to the root directory of the recording unit. In Step S803, the system control unit 50 extracts the images in the medium other than DCF images via a recursive image search process described later with reference to FIG. 12. In Step S804, the system control unit 50 rearranges the extracted files in the image file list in a predetermined order such as time stamp order or file path order. In Step S805, the system control unit 50 sets an end-of-image-search flag, performs end-of-image-search processing, and finishes the image search process.

<About Recursive Image Search Process>

Figure 12:
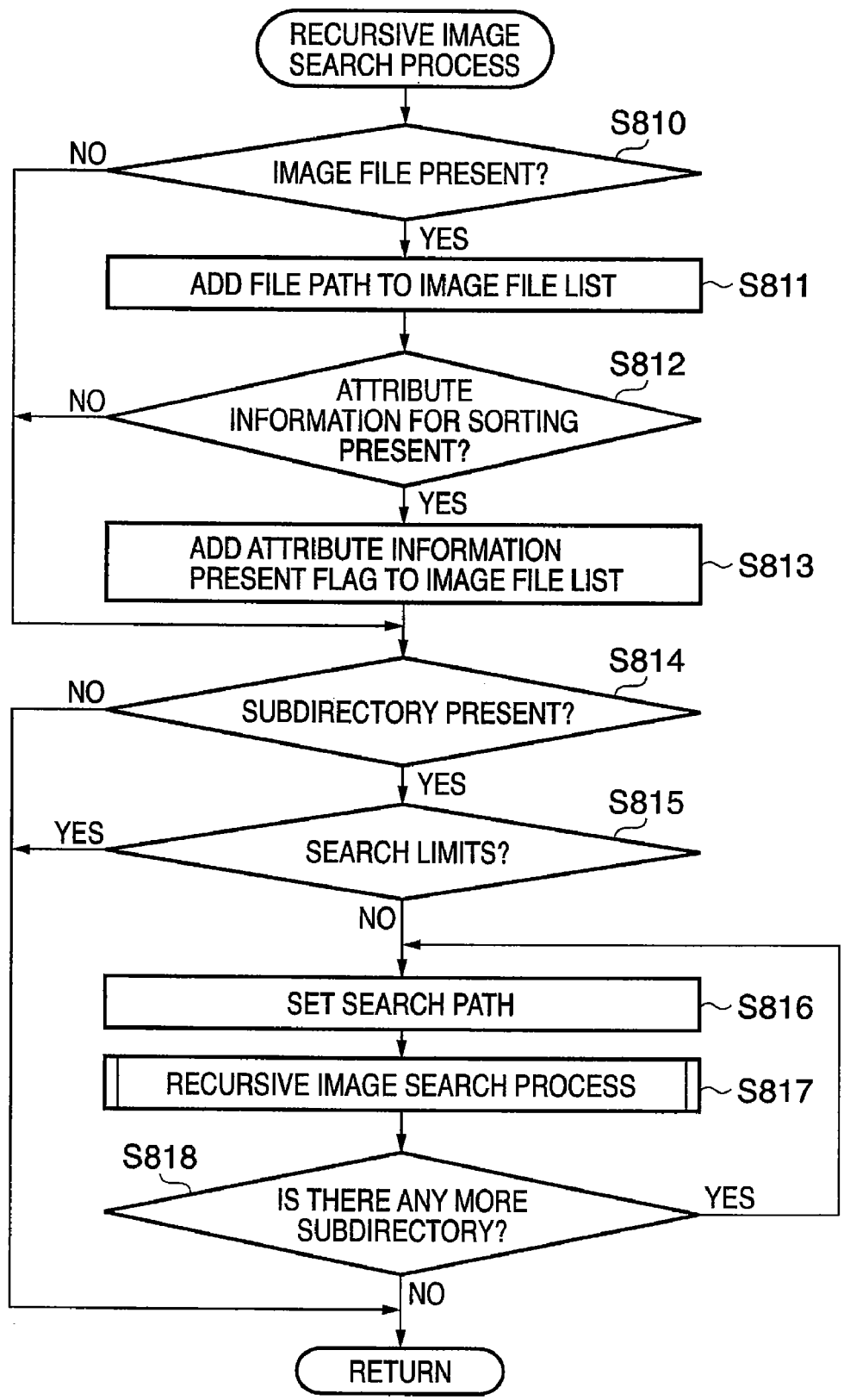
FIG. 12 is a flowchart of a recursive image search process according to this embodiment.

FIG. 12 is a flowchart showing details of the recursive image search process in Step S803 of FIG. 11.

In Step S810, the system control unit 50 checks the directory with the currently set search path for any image file. If there is any image file, the system control unit 50 adds the file path to the image file list in Step S811. The file path is a file identifying information which uniquely identifies the image file in the recording medium 200 or 210. A short file name is used here for the file path. For example, a file which has a long file name generally has an abbreviated file name (short file name) which can be used in the file identifying information. Incidentally, in the first step, that is, in Step S810, the system control unit 50 checks the search path (root directory) set in Step S802 for any image file. As a result of the above processes, as shown in FIG. 17, the file path 1711 of the image file stored in the recording medium 200 (210) is recorded in the image file list 1710 in the memory 52, where the file path 1711 uses the short file name 1701 of the image file. If the image file has, for example, a long file name 1700, an Attribute Information Present flag 1712 is set to ON.

Furthermore, in Step S812, the system control unit 50 checks the file for predetermined attribute information. The attribute information can be an attribute contained in the file and/or directory entry. Here, the system control unit 50 checks whether or not a long file name (extended file name) exists. If it is determined that attribute information (an extended file name) exists, the system control unit 50 stores the Attribute Information Present flag by associating it with the file path in Step S813. Next, in Step S814, the system control unit 50 checks whether or not there is a subdirectory on the search path. Incidentally, since DCF images are extracted as a result of the DCF image search process (S603), DCF directories are excepted. If it is determined that there is no subdirectory, the system control unit 50 finishes processing.

On the other hand, if it is determined that there is a subdirectory, the system control unit 50 searches the subdirectory. In so doing, the system control unit 50 checks in Step S815 for restrictions on memory capacity of the equipment and search limits according to specifications or the like (e.g., whether the number of directory levels, the number of files to be added to the image file list, or the like has not reached an upper limit). If it is determined that a search limit has been reached, the system control unit 50 finishes processing. If it is determined that no search limit has been reached, the system control unit 50 sets the search path of the detected subdirectory in Step S816. Then, in Step S817, the system control unit 50 performs a recursive image search process of the new search path. When the recursive image search process of the subdirectory is finished, the system control unit 50 determines in Step S818 whether there is any more subdirectory in the same directory hierarchy. If there is any more subdirectory, the system control unit 50 performs a recursive image search process of the subdirectory. That is, the system control unit 50 sets the search path of the subdirectory in Step S816 and performs a recursive image search process of the new search path in Step S817.

In this way, when rearranging a group of images according to a specific rule, if no specific directory structure is prescribed as in the case of DCF images, it is necessary to acquire the paths of all the image files in the image group in advance.

<About Image File List Sorting Process>

Figure 13:
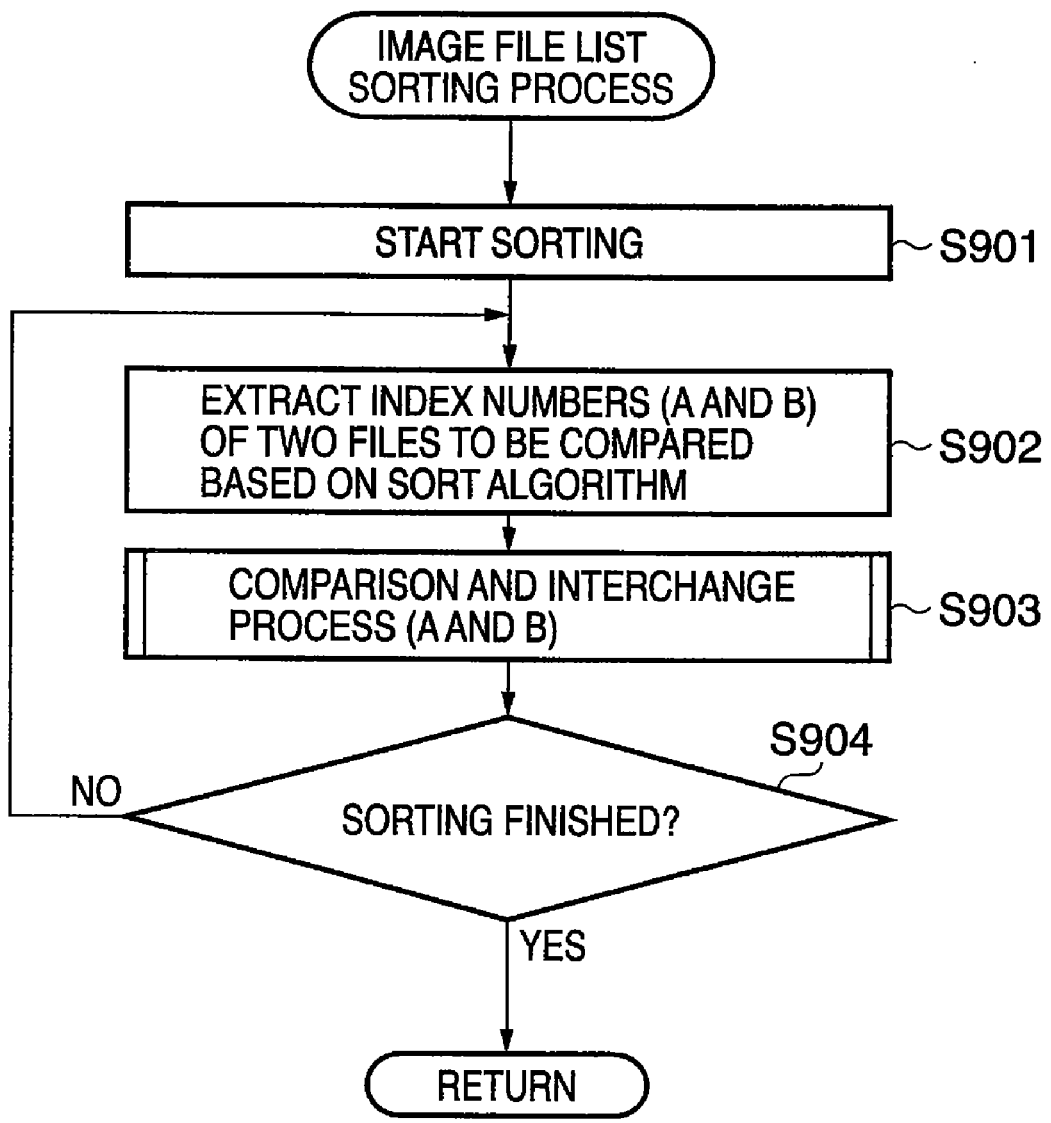
FIG. 13 is a flowchart of a file list sorting process according to this embodiment.

FIG. 13 is a flowchart showing details of an image file list sorting process in Step S804 of FIG. 11.

In Step S901, to start sorting, the system control unit 50 initializes an internal counter, counts the number of files contained in the image file list on the file path created in the recursive image search process in FIG. 12, and so on. Bubble sort, quick sort, or other typical sort algorithms perform sorting by repeating comparison and interchange of information corresponding to two files in the image file list. Also, according to this embodiment, sorting is performed through repeated comparison and interchange of two sets of information.

Thus, in Step S902, two index numbers to be compared in the course of a sort algorithm are extracted from the image file list. It is assumed here that identifiers of the index numbers of two files are A and B. Next, in Step S903, the system control unit 50 compares data corresponding to indices A and B extracted from the image file list, that is, the file paths and attribute information extracted as a result of the recursive image search process in FIG. 12, judges which is larger, and interchanges data between the indices A and B as required. In Step S904, if it is determined that sorting has been completed through the repetition of Steps S902 and Step S903 by the sort algorithm, the system control unit 50 finishes the sorting process.

Figure 14:
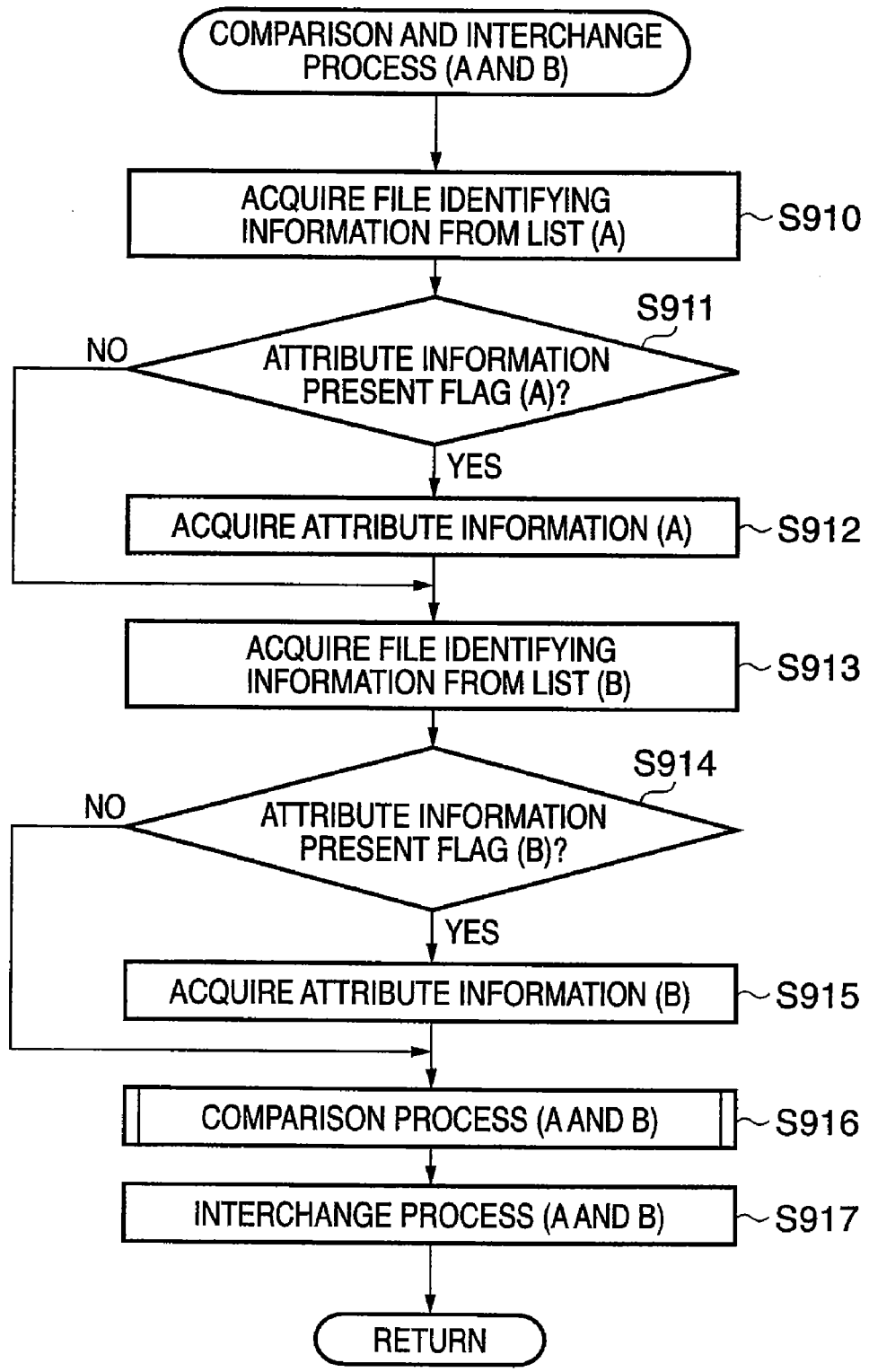
FIG. 14 is a flowchart of a comparison and interchange process according to this embodiment.

FIG. 14 is a flowchart showing details of the comparison and interchange process in Step S903 of FIG. 13.

In Step S910, the system control unit 50 acquires file identifying information for index A from the image file list. In Step S911, the system control unit 50 determines whether the Attribute Information Present flag for index A is set. The Attribute Information Present flag is an example of attribute information existence information which indicates the presence or absence of attribute information. If the Attribute Information Present flag is set (i.e., if attribute existence information indicates the presence of an attribute), the system control unit 50 goes to Step S912. In Step S912, the system control unit 50 acquires attribute information (e.g., an extended file name) for index A from the recording medium 200 or 210. In this example, a corresponding extended file name is acquired. That is, as shown in FIG. 17, if the Attribute Information Present flag 1712 indicates the presence of attribute information, the long file name 1700 of the image file represented by the file path 1711 is acquired. In Step S913, the system control unit 50 acquires file identifying information for index B from the image file list. In Step S914, the system control unit 50 determines whether the Attribute Information Present flag for index B is set. If the Attribute Information Present flag is set, the system control unit 50 goes to Step S915. In Step S915, the system control unit 50 acquires attribute information (e.g., an extended file name) for index B from the recording medium 200 or 210 through a process similar to the one used for index A.

Next, in Step S916, the system control unit 50 performs a comparison process to compare the sizes of indices A and B using the acquired file identifying information and attribute information about indices A and B. Details of the comparison process will be described later with reference to a flowchart in FIG. 15. Next, in Step S917, the system control unit 50 interchanges contents of indices A and B in the image file list, as required, based on results of the comparison process.

Figure 15:
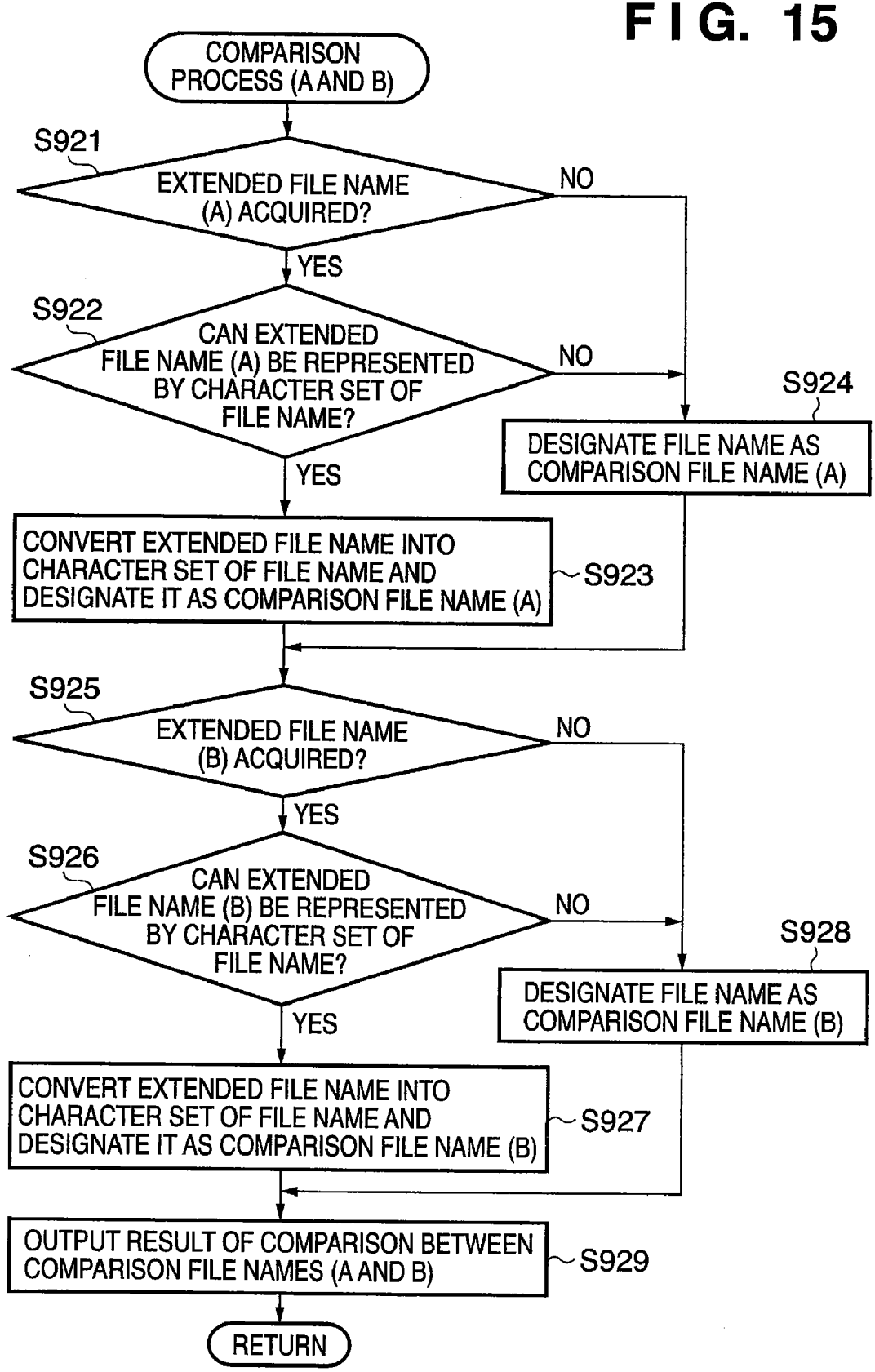
FIG. 15 is a flowchart of a comparison process according to this embodiment.

FIG. 15 is a detailed flowchart of the comparison process in Step S916 of FIG. 14.

If an extended file name of the file corresponding to index A in the file list can be represented by a character set used for the file name, the system control unit 50 converts the extended file name into the character set of the file name and designates the resulting file name as a comparison file name. This is the case, for example, when the UNICODE character set is used for the extended file name and the ASCII character set is used for the file name. On the other hand, if there is no extended file name or if the character set of the extended file name cannot be represented by the character set of the file name, the file name in the file identifying information is used as a comparison file name.

That is, in Step S921, the system control unit 50 determines whether or not an extended file name has been acquired. If it is determined that an extended file name has been acquired, the system control unit 50 determines in Step S922 whether the extended file name can be represented by the character set contained in the file identifying information. If it can be, the system control unit 50 converts the extended file name into the character set of the file name and designates it as a comparison file name of index A in Step S923. On the other hand, if there is no extended file name or if the character set of the extended file name cannot be represented by the character set of the file name, the system control unit 50 designates the file name in the file identifying information as a comparison file name in Step S924.

Similarly, if an extended file name of the file corresponding to index B in the file list can be represented by a character set used for the file name, the extended file name is used as a comparison file name after conversion into the character set of the file name. On the other hand, if there is no extended file name or if the character set of the extended file name cannot be represented by the character set of the file name, the file name is used as a comparison file name. That is, in Step S925, the system control unit 50 determines whether an extended file name of the index B file has been acquired. If it is determined that an extended file name has been acquired, the system control unit 50 determines in Step S926 whether the extended file name can be represented by the character set contained in the file identifying information. If it can be, the system control unit 50 converts the extended file name into the character set of the file name and designates it as a comparison file name of index B in Step S927. On the other hand, if there is no extended file name or if the character set of the extended file name cannot be represented by the character set of the file name, the system control unit 50 designates the file name in the file identifying information as a comparison file name in Step S928.

It has been stated that if there is no extended file name or if the character set of the extended file name cannot be represented by the character set of the file name, the file name is used as a comparison file name. This allows comparison of character strings. However, binary data may be compared without matching character sets. For example, a short file name "AB (ASCII: 41h, 42h)" and extended file name "DD (UNICODE: 00043h, 0044h)" may be compared in terms of binary values. In that case, even an extended file name which cannot be represented by the character set of the file name can be used as a comparison file name.

In Step S929, the system control unit 50 compares the comparison file names of the files corresponding to indices A and B. Results of the comparison are used in the interchange process in Step S917.

<<Image Display Process (S607)>>

Figure 10:
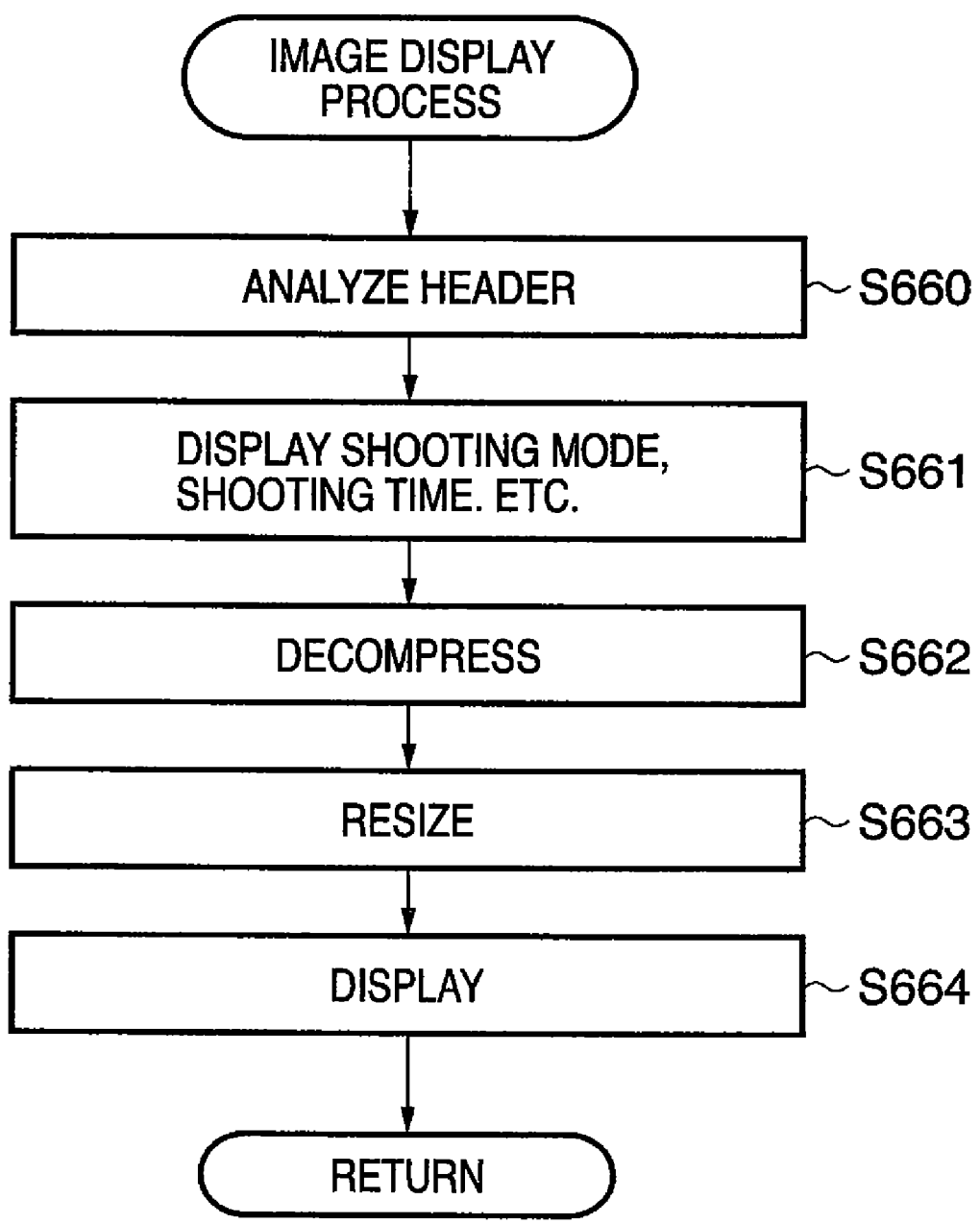
FIG. 10 is a flowchart of a reproduced-image display process according to this embodiment.

FIG. 10 is a flowchart showing details of the image display process in Step S607 of FIG. 5.

In Step S660, the system control unit 50 analyzes Exif information and other attribute information contained in the header of the image file, and thereby acquires information such as shooting mode, shooting time, image size, and model ID of the camera. In Step S661, the system control unit 50 displays the shooting mode, shooting time, and image size on the LCD of the display unit 54. The system control unit 50 performs decompression using the compression/decompression circuit 32 in Step S662, resizes the image data to VRAM size for display in Step S663, and displays the image in the image display unit 28 in Step S664.

In this way, by storing the presence or absence of attached attribute information such as an extended file name together with information such as a file name which identifies the file without storing the attribute information itself such as the extended file name, it is possible to reduce memory usage and thus handle a larger number of files. In the process of determining the reproducing order of files, the use of attached attribute information such as extended file names improves ease-of-use for the user, but storing this information increases memory usage. Even in such a case, since only necessary attribute information is read out only when it is used rather than holding all the attribute information, it is possible to reduce memory usage and speed up processing.

Since comparison is made by converting the character set of an extended file name, when the extended file name can be represented by the character set of the file name, the reproducing order is easy to understand for the user.

<<Advantages of Configuration According to the Embodiment>>

As described above, when determining a reproduction method (reproducing order) using file identifying information and attribute information, memory usage can be reduced because there is no need to hold all attribute information simultaneously. That is, a larger number of files can be handled using the same amount of memory. Also, since an Attribute Information Present flag is maintained and an attribute is acquired only when necessary, it is possible to increase overall processing speed and improve the ease-of-use for the user compared to when trying to acquire attribute information about all files. Besides, it is possible to determine an appropriate reproducing order and images to be reproduced when the user views the images.

The file identifying information consists of file name, file address, and file number while the predetermined attribute information can consist of extended file name, time information, hidden attribute, write inhibit attribute, and archive attribute. Incidentally, the time information indicates the creation date/time and update date/time of the file. The hidden attribute indicates whether or not the file is a hidden file. The write inhibit attribute indicates that the file is a read-only (write-protected) file. The archive attribute indicates that the file needs to be backed up (transmitted). Thus, for example, when determining the reproducing order using file names and extended file names, memory usage can be reduced because there is no need to hold all extended file names simultaneously. That is, a larger number of files can be handled using the same amount of memory. Also, an Attribute Information Present flag which indicates the presence or absence of an extended file name is maintained and an attribute is acquired only when an extended file name is available. This increases overall processing speed and improves the ease-of-use for the user compared to when trying to acquire extended file names of all files.

Also, the use of attributes described in the file or directory entry makes it possible to use appropriate attribute information. Also, since the attribute information is acquired temporarily when related file identifying information is used, it is possible to reduce memory usage compared to when holding all attribute information simultaneously. Also, if extended file names can be represented by the same character set as the file identifying information (file names), the reproducing order is determined through comparison after converting the extended file names into the character set of the file names. This makes it possible to reduce memory usage, speed up processing, and determine the reproducing order in the easiest way for the user to understand.

Although in the above embodiment, the reproducing order of image files is determined using their extended file names (long file names), the present invention is not limited to this. For example, attribute information (time information, hidden attribute, write inhibit attribute, archive attribute, and the like) other than extended file names may be used to determine the reproducing order of image files or whether or not to reproduce image files.

For example, "time information (which represents file creation/update date and time)" may be used to reproduce files in order of time, reproduce only files created/updated at specific times, or the like. Also, attributes can be used for reproduction control, such as determining whether or not to reproduce image files using any of, or any combination of, "hidden attribute," "write inhibit attribute," and "archive attribute" or determining the reproducing order by grouping files with the same attribute.

In each case, since the Attribute Information Present flag allows attribute information to be acquired only when it exists, it is possible to reduce memory usage and improve processing efficiency. Incidentally, it is assumed that the Attribute Information Present flag indicates the presence or absence of the attribute information used for reproduction control. For example, if the "hidden attribute" is used for reproduction control, the Attribute Information Present flag indicates whether or not the file has the "hidden attribute."

Incidentally, although a digital camera has been taken as an example in the embodiment described above, it is apparent that the present invention is also applicable to cell phones and other electronic devices.

The present invention makes it possible to acquire necessary attribute information as appropriate from a detachable recording medium which stores files and thereby determine a file reproduction method which takes long file names into consideration while reducing usage of internal memory.

Other Embodiments

Incidentally, the present invention can also be achieved by a configuration in which a software program that implements the functions of the embodiment described above is supplied to a system or apparatus either directly or remotely and a computer in the system or apparatus reads out and executes the supplied program code. In that case, the supplied program corresponds to the flowcharts illustrated in the embodiment.

Thus, the program code itself installed on the computer to implement functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions.

Recording media available for use to supply programs include, for example, floppy (registered trademark) disks, hard disks, optical disks, magneto-optical disks, MO, CD-ROM, CD-R, CD-RW, magnetic tape, non-volatile memory cards, ROM, and DVD (DVD-ROM and DVD-R).

The program can also be supplied via an Internet homepage. In that case, the user is supposed to connect to an Internet homepage using a browser on a client computer and download the computer program of the present invention onto a recording medium such as a hard disk. The program may be downloaded as a compressed self-installing file. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiment may be implemented not only by the program read out and executed by the computer, but also in conjunction with an OS or the like running on the computer. In that case, the functions of the above embodiment are implemented by part or all of the actual processing executed by the OS or the like in accordance with instructions from the program.

Furthermore, part or all of the functions of the above embodiment may also be implemented by part or all of the actual processing executed by a CPU or the like contained in a function expansion board inserted into the computer or a function expansion unit connected to the computer if the processing is performed in accordance with instructions from the program that has been read out of the storage medium and written into memory on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-227020, filed Aug. 23, 2006, which is hereby incorporated by reference herein in its entirety.

What is claimed is:

1. An information display apparatus which reproduces an image file stored in a recording medium, comprising:
   an acquiring unit adapted to acquire a short file name which identifies an image file stored in the recording medium;
   a setting unit adapted to set an attribute information existence flag which indicates whether or not an extended file name corresponding to the image file identified by the short file name is stored in the recording medium;
   a generating unit adapted to generate an image file list which records short file name of each of image files stored in the recording medium and records the attribute information existence flag in association with the short file name; and
   a determining unit adapted to determine a reproducing order of the image files recorded in the image file list by sorting image files recorded in the image file list by using the short file name for a file determined not to have an extended file name by the attribute information existence flag and by using extended file name instead of the short file name for a file determined to have an extended file name by the attribute information existence flag.

2. The information display apparatus according to claim 1, wherein the extended file name is contained in files or a directory entry.

3. The information display apparatus according to claim 1, wherein the determining unit sorts the image files by comparing file names of two image files among the image files recorded in the image file list, and the extended file name is acquired temporarily for the comparison.

4. The information display apparatus according to claim 1, wherein:
   said information display apparatus further comprises a converting unit adapted to convert the extended file name into the same character set as the short file name if the extended file name can be represented by the same character set as the short file name; and
   said determining unit determines the reproducing order using the extended file name converted by said converting unit.

5. A control method for an information display apparatus which reproduces an image file stored in a recording medium, comprising:
   an acquiring step of acquiring a short file name which identifies an image file stored in the recording medium;
   a setting step of setting an attribute information existence flag which indicates whether or not an extended file name corresponding to the image file identified by the short file name is stored in the recording medium;
   a generating step of generating an image file list which records short file name of each of image files stored in the recording medium and records the attribute information existence flag in association with the short file name; and
   a determining step of determining a reproducing order of the image files recorded in the image file list by sorting image files recorded in the image file list by using the short file name for a file determined not to have an extended file name by the attribute information existence flag and by using extended file name instead of the short file name for a file determined to have an extended file name by the attribute information existence flag.

6. The control method according to claim 5, wherein the extended file name is contained in files or a directory entry.

7. The control method according to claim 5, wherein the determining step sorts the image files by comparing file names of two image files among the image files recorded in the image file list, and the extended file name is acquired temporarily for the comparison.

8. The control method according to claim 5, wherein:
   said control method further comprises a converting step of converting the extended file name into the same character set as the short file name if the extended file name can be represented by the same character set as the short file name; and
   said determining step determines the reproducing order using the extended file name converted by said converting unit.

9. A computer-readable storage medium containing a control program which makes a computer execute the information display method according to claim 5.

* * * * *